US008633927B2

(12) United States Patent
Mech et al.

(10) Patent No.: US 8,633,927 B2
(45) Date of Patent: *Jan. 21, 2014

(54) RE-RENDER ACCELERATION OF FRAME WITH LIGHTING CHANGE

(75) Inventors: Radomir Mech, Moutain View, CA (US); Larry I. Gritz, Berkeley, CA (US); Eric B. Enderton, Berkeley, CA (US); John F. Schlag, Novato, CA (US); Daniel Elliot Wexler, Soda Springs, CA (US); Philip A. Nemec, San Jose, CA (US)

(73) Assignee: nVidia Corporation, Santa Clara, CA (US)

( * ) Notice: Subject to any disclaimer, the term of this patent is extended or adjusted under 35 U.S.C. 154(b) by 318 days.

This patent is subject to a terminal disclaimer.

(21) Appl. No.: 11/493,058

(22) Filed: Jul. 25, 2006

(65) Prior Publication Data

US 2008/0024495 A1   Jan. 31, 2008

(51) Int. Cl.
  *G06T 15/50*  (2011.01)
  *G06T 15/60*  (2006.01)
  *G06K 9/40*  (2006.01)

(52) U.S. Cl.
  USPC .......................................... 345/426; 382/274

(58) Field of Classification Search
  USPC .......................................... 345/426; 382/274
  See application file for complete search history.

(56) References Cited

U.S. PATENT DOCUMENTS

| 5,088,054 A | 2/1992 | Paris, II |
| 5,283,860 A | 2/1994 | Einkauf et al. |
| 5,574,835 A | 11/1996 | Duluk et al. |
| 5,592,678 A | 1/1997 | Cook et al. |
| 5,596,686 A | 1/1997 | Duluk, Jr. |
| 5,600,763 A | 2/1997 | Greene et al. |
| 5,701,404 A | 12/1997 | Stevens et al. |
| 5,774,386 A | 6/1998 | Pawle |
| 5,787,289 A | 7/1998 | Cook et al. |
| 5,808,617 A * | 9/1998 | Kenworthy et al. .......... 345/421 |
| 5,850,230 A | 12/1998 | San et al. |
| 5,864,342 A * | 1/1999 | Kajiya et al. .................. 345/418 |
| 5,867,166 A * | 2/1999 | Myhrvold et al. ............. 345/419 |
| 5,914,726 A * | 6/1999 | Schultz ......................... 345/501 |
| 5,977,986 A | 11/1999 | Coelho |
| 5,977,987 A | 11/1999 | Duluk, Jr. |
| 6,064,393 A * | 5/2000 | Lengyel et al. ............... 345/427 |
| 6,091,422 A * | 7/2000 | Ouaknine et al. ............. 345/419 |
| 6,111,582 A * | 8/2000 | Jenkins ......................... 345/421 |
| 6,285,378 B1 | 9/2001 | Duluk, Jr. |

(Continued)

FOREIGN PATENT DOCUMENTS

KR   10-2002-0022388   4/2002

OTHER PUBLICATIONS

"Last Time", CS679—Fall 2003—Copyright University of Wisconsin, 23 pgs.

(Continued)

*Primary Examiner* — David T Welch
(74) *Attorney, Agent, or Firm* — Berkeley Law & Technology Group, LLP

(57) ABSTRACT

In an example embodiment, 3D graphics object information associated with a render of a frame may be stored in an object-indexed cache in a memory. The 3D graphics object information comprises results for one or more shading operations further comprises one or more input values for the one or more shading operations.

29 Claims, 23 Drawing Sheets

(56) References Cited

U.S. PATENT DOCUMENTS

| | | |
|---|---|---|
| 6,288,730 B1 | 9/2001 | Duluk et al. |
| 6,329,986 B1 | 12/2001 | Cheng |
| 6,377,257 B1 | 4/2002 | Borrel et al. |
| 6,396,503 B1 | 5/2002 | Goss et al. |
| 6,426,747 B1 * | 7/2002 | Hoppe et al. ............. 345/419 |
| 6,426,755 B1 | 7/2002 | Deering |
| 6,459,434 B1 | 10/2002 | Cohen et al. |
| 6,476,807 B1 | 11/2002 | Duluk et al. |
| 6,549,210 B1 | 4/2003 | Van Hook et al. |
| 6,570,578 B1 * | 5/2003 | Smirnov et al. ........... 345/629 |
| 6,577,679 B1 | 6/2003 | Apostolopoulos |
| 6,593,925 B1 | 7/2003 | Hakura et al. |
| 6,603,474 B1 | 8/2003 | Cobb et al. |
| 6,614,445 B1 | 9/2003 | Dorbie |
| 6,664,959 B2 | 12/2003 | Duluk et al. |
| 6,672,963 B1 | 1/2004 | Link |
| 6,684,255 B1 | 1/2004 | Martin |
| 6,717,576 B1 * | 4/2004 | Duluk et al. ............... 345/419 |
| 6,809,739 B2 | 10/2004 | Farinelli et al. |
| 6,853,377 B2 | 2/2005 | Pharr |
| 6,876,362 B1 | 4/2005 | Newhall, Jr. et al. |
| 6,989,840 B1 | 1/2006 | Everitt et al. |
| 6,999,100 B1 | 2/2006 | Leather et al. |
| 7,009,605 B2 | 3/2006 | Dietrich et al. |
| 7,015,914 B1 | 3/2006 | Bastos et al. |
| 7,061,502 B1 | 6/2006 | Law et al. |
| 7,071,937 B1 | 7/2006 | Collodi |
| 7,091,979 B1 | 8/2006 | Donovan |
| 7,106,328 B2 | 9/2006 | Royan |
| 7,139,794 B2 | 11/2006 | Levanon et al. |
| 7,145,565 B2 | 12/2006 | Everitt et al. |
| 7,145,656 B2 | 12/2006 | Rodrigues et al. |
| 7,310,098 B2 | 12/2007 | Ohba |
| 7,376,279 B2 | 5/2008 | Dekel et al. |
| 7,388,585 B2 | 6/2008 | Kristiansen |
| 7,817,158 B1 * | 10/2010 | Wainwright ............... 345/581 |
| 2001/0055019 A1 | 12/2001 | Sowizral et al. |
| 2002/0091738 A1 * | 7/2002 | Rohrabaugh et al. ........ 707/517 |
| 2002/0118202 A1 * | 8/2002 | Baldwin ................. 345/530 |
| 2002/0118224 A1 | 8/2002 | Levanon et al. |
| 2002/0126117 A1 | 9/2002 | Grzeszczuk et al. |
| 2002/0140703 A1 * | 10/2002 | Baker et al. ............. 345/582 |
| 2002/0178341 A1 | 11/2002 | Frank |
| 2002/0180757 A1 | 12/2002 | Duerr et al. |
| 2002/0196251 A1 | 12/2002 | Duluk et al. |
| 2003/0043169 A1 | 3/2003 | Hunter |
| 2003/0112237 A1 * | 6/2003 | Corbetta ................ 345/426 |
| 2003/0169255 A1 | 9/2003 | Lavelle et al. |
| 2003/0179197 A1 | 9/2003 | Sloan et al. |
| 2003/0179220 A1 | 9/2003 | Dietrich et al. |
| 2003/0227457 A1 | 12/2003 | Pharr et al. |
| 2004/0066384 A1 | 4/2004 | Ohba |
| 2004/0125103 A1 | 7/2004 | Kaufman et al. |
| 2004/0150641 A1 | 8/2004 | Duiker |
| 2004/0169651 A1 | 9/2004 | Everitt et al. |
| 2004/0183797 A1 | 9/2004 | Kamiwada et al. |
| 2004/0201592 A1 * | 10/2004 | Huang .................. 345/558 |
| 2004/0263511 A1 | 12/2004 | West et al. |
| 2005/0022131 A1 | 1/2005 | Saint-Hilaire et al. |
| 2005/0039176 A1 | 2/2005 | Fournie |
| 2005/0225670 A1 | 10/2005 | Wexler |
| 2005/0253839 A1 * | 11/2005 | Bugaj et al. ............. 345/418 |
| 2006/0161572 A1 * | 7/2006 | Vogt et al. .............. 707/101 |
| 2006/0177122 A1 | 8/2006 | Yasue |
| 2006/0209067 A1 * | 9/2006 | Pellacini et al. ........... 345/426 |
| 2007/0146389 A1 * | 6/2007 | Distler ................. 345/629 |
| 2008/0024495 A1 | 1/2008 | Mech et al. |

OTHER PUBLICATIONS

"Order-Independent Transparency Rendering System and Method", U.S. Appl. No. 09/944,988, filed Aug. 31, 2001, 35 pgs.

Carr et al., "The Ray Engine", University of Illinois, Graphics Hardware 2002, 10 pgs.

Djeu, Peter, "Graphics on a Stream Processor", Mar. 20, 2003, 53 pgs.

Haeberli et al., "The Accumulation Buffer: Hardware Support for High-Quality Rendering", Computer Graphics, vol. 24, No. 4, Aug. 1990, pp. 309-318.

Haller, Michael, "Shader Programming Cg, NVIDIA's Shader Language", 2003, www.nvidia.com, 45 pgs.

Heckbert et al., "Beam Tracing Polygonal Objects", Computer Graphics, vol. 18, No. 3, Jul. 1984, pp. 119-127.

Kapasi et al., "Programmable Stream Processors", Computer. Org., vol. 36, No. 8, Aug. 2003 IEEE Computer Society, pp. 1-14.

Kumar et al., "Efficient Rendering of Trimmed NURBS Surfaces", Apr. 23, 1995, pp. 1-28.

Lindhold et al., "A User-Programmable Vertex Engine", NVIDIA Corporation, 2001 ACM, pp. 149-158.

Luebke, David, "Programmable Graphics Hardware", Nov. 20, 2003, 22 pgs.

Macedonia, Michael, "The GPU Enters Computing's Mainstream", 2003 IEEE, pp. 1-5.

Mammen, Abraham, "Transparency and Antialiasing Algorithms Implemented with the Virtual Pixel Maps Technique", IEEE Computer Graphics and Applications, vol. 9, Issue 4:43-55, Jul. 1989.

Peercy et al., "Interactive Multi-Pass Programmable Shading", ACM 2000, pp. 425-432.

Pharr et al., "Rendering Complex Scenes with Memory-Coherent Ray Tracing", Computer Science Dept., Stanford University, 1997, 8 pgs.

Polyglot, "What Are These Pixel Shaders of Which You Speak", Oct. 28, 2003, Kuro5hin, www.kuro5hin.org., pp. 1-11.

Proudfoot et al., "A Real-Time Procedural Shading System for Programmable Graphics Hardware", 2001 ACM, pp. 159-170.

Purcell et al., "Ray Tracing on Programmable Graphics Hardware", Stanford University, 2002 ACM, pp. 703-712.

Rockwood et al., "Real-time Rendering of Trimmed Surfaces", Computer Graphics, vol. 23, No. 3, Jul. 1989, pp. 107-116.

Shantz et al., "Rendering Trimmed NURBS with Adaptive Forward Differencing", Computer Graphics, vol. 22, No. 4, Aug. 1988, pp. 189-198.

Shinya et al., "Principles and Applications of Pencil Tracing", Computer Graphics, vol. 21, No. 4, Jul. 1987, pp. 45-54.

Tomov, Stan, "Numerical Simulations Using Programmable GPUs", Data Analysis and Visualization, Sep. 5, 2003, Brookhaven Science Associates, 16 pgs.

Zenz, Dave, "Advances in Graphics Architectures", Dell Graphics Technologist, Sep. 2002 Dell Computer Corporation, pp. 1-6.

Amazon.com: AutoCAD LT 2007 [Old Version]: Software, http://www.amazon.com/AutoCAD-LT-2007-OLD-VERSION/dp/B000F4CV1C/ref=sr_1_1?ie=UTF8&s=software&qid=1221488098&sr=1-1, retrieved Sep. 15, 2008, 12 pages.

Everitt, Cass Watson, "High-Quality, Hardware-Accelerated Per-Pixel Illumination for Consumer Class OpenGL Hardware", Mississippi State University, 2000, 36 pages.

Fernando et al., 2001, Adaptive Shadow Maps, Proceedings of the 28th Annual Conference on Computer Graphics and Interactive Techniques SIGGRAPH '01, ACM, New York, NY, 387-390.

Gershbein et al., "A Fast Relighting Engine for Interactive Cinematic Lighting Design", Proceedings of the 27th Annual Conference on Computer Graphics and Interactive Techniques, ACM Press / Addison-Wesley Publishing Co., 2000, 6 pages.

Gortler et al., "The Lumigraph", Proceedings of the 23rd Annual Conference on Computer Graphics and Interactive Techniquest, SIGGRAPH '96, ACM, New York, NY, pp. 43-54.

Gurrea, Emilio, "4D Light Field Modeling and Rendering", Phd. Thesis, The University of Texas at Austin, 2001, 187 pages.

Hurley, "Between the Lines: AutoCAD 2007 Rendering on Multi-Core CPU", http://web.archive.org/web/20061103053717/http://autodesk.blogs.com/between_the_lines/2006/10/autocad_2007_re_1.html, retrieved Sep. 15, 2008, 8 pages.

Luebke et al., "Perceptually Driven Simplification for Interactive Rendering", Proceedings of the 2001 Eurographics Workshop on Rendering, Jun. 2001, London; published as Rendering techniques 2001, Ed. Steven Gortler and Karol Myszkowski, Springer-Verlag, Vienne, 12 pages.

(56) References Cited

OTHER PUBLICATIONS

Walter et al., "Interactive Rendering Using the Render Cache, Rendering Techniques '99", Springer-Verlog, Proceedings 10$^{th}$ Eurographics Workshop on Rendering, 1999, 13 pages.
Office action mailed Dec. 29, 2008 in co-pending U.S. Appl. No. 11/493,440, 22 pages.
Amendment filed Mar. 30, 2009 in co-pending U.S. Appl. No. 11/493,440, 20 pages.
Office action mailed Dec. 30, 2008 in co-pending U.S. Appl. No. 11/493,166, 19 pages.
Amendment filed, Mar. 30, 2009 in co-pending U.S. Appl. No. 11/493,166, 19 pages.
Office action mailed Oct. 9, 2008 in co-pending U.S. Appl. No. 11/493,463, 20 pages.
Amendment filed Mar. 9, 2009 in co-pending U.S. Appl. No. 11/493,463, 16 pages.
Office action mailed Dec. 31, 2008 in co-pending U.S. Appl. No. 11/493,505, 21 pages.
Amendment filed Apr. 29, 2009 in co-pending Appl. No. 11/493,505, 19 pages.
Office action mailed Dec. 30, 2008 in co-pending U.S. Appl. No. 11/493,497, 26 pages.
Amendment and Terminal Disclaimers mailed Mar. 30, 2009 n co-pending U.S. Appl. No. 11/493,497, 25 pages.
Office action mailed Feb. 9, 2009 in co-pending U.S. Appl. No. 11/493,168, 38 pages.
Amendment and Terminal Disclaimers filed Apr. 29, 2009 in co-pending Appl. No. 11/493,168, 30 pages.
Manual of Patent Examining Procedure, Chapter 2100, subsection 2112 [R-3], Original Eighth Edition, U.S. Patent and Trademark Office, Aug. 2001, current revision Aug. 2008, pp. 1-4, 7 pages.
Office action mailed Jul. 22, 2009 in co-pending U.S. Appl. No. 11/493,440, 48 pages.
Office action mailed May 29, 2009 in co-pending U.S. Appl. No. 11/493,463, 29 pages.
Final Office action mailed Jul. 22, 2009 in co-pending U.S. Appl. No. 11/493,505, 44 pages.
Amendment and Terminal Disclaimer on U.S. Appl. No. 11/493,166, filed Sep. 22, 2009 in U.S. Appl. No. 11/493,440, 23 pages.
Advisory action mailed Oct. 1, 2009 in U.S. Appl. No. 11/493,440, 4 pages.
Request for Continued Examination and Amendment filed Dec. 21, 2009 in U.S. Appl. No. 11/493,440, 26 pages.
Final Office action mailed Jul. 23, 2009 in U.S. Appl. No. 11/493,166, 34 pages.
Amendment After Final filed Sep. 23, 2009 in U.S. Appl. No. 11/493,166, 20 pages.
Advisory Action mailed Oct. 6, 2009 in U.S. Appl. No. 11/493,166, 5 pages.
Request for Continued Examination and Amendment filed Dec. 22, 2009 in U.S. Appl. No. 11/493,166, 25 pages.
Terminal Disclaimer on pending U.S. Appl. No. 11/493,058 and Amendement filed Nov. 30, 2009 in co-pending U.S. Appl. No. 11/493,463, 27 pages.
Amendment After Final and Terminal Disclaimer on pending U.S. Appl. No. 11/493,166, filed Sep. 22, 2009 in U.S. Appl. No. 11/493,505, 20 pages.
Advisory Action mailed Oct. 6, 2009 in U.S. Appl. No. 11/493,505, 4 pages.
Request for Continued Examination and Amendment under 37 CFR 114, filed Nov. 12, 2009 in U.S. Appl. No. 11/493,505, 21 pages.
Amendment After Final and Terminal Disclaimer on pending U.S. Appl. No. 11/493,168, filed Sep. 21, 2009 in U.S. Appl. No. 11/493,497, 19 pages.
Advisory Action mailed Sep. 30, 2009 in U.S. Appl. No. 11/493,497, 4 pages.
Request for Continued Examination and Amendment filed Dec. 21, 2009 in U.S. Appl. No. 11/493,497, 23 pages.
Amendment After Final filed Sep. 21, 2009 in U.S. Appl. No. 11/493,168, 18 pages.
Advisory action mailed Sep. 30, 2009 in U.S. Appl. No. 11/493,168, 4 pages.
Request for Continued Examination and Amendment filed Dec. 21, 2009 in U.S. Appl. No. 11/493,168, 23 pages.
Final Office actoin mailed Jul. 21, 2009 in co-pending U.S. Appl. No. 11/493,497, 40 pages.
Final Office action mailed Jul. 21, 2009 in co-pending U.S. Appl. No. 11/493,168, 34 pages.

\* cited by examiner

RE-RENDER ACCELERATION OF FRAME WITH LIGHTING CHANGE

FIELD

The subject matter disclosed herein relates to computer graphics rendering, and more particularly to accelerating re-rendering of frames.

BACKGROUND

For high-quality rendering, such as for film visual effects and/or animation, a render of a single frame may take many minutes or even hours. A significant bottleneck may occur in the creative process when an artist desires to make lighting changes to an otherwise completed scene. This process may be very time consuming because for every change (where to place the light, the color of the light, whether the light should cast shadows, how blurry the shadows should be, etc.), a re-render must be performed for the change to be made visible to the lighting artist and/or director. Adding to the time-consuming nature of the process is the iterative nature of lighting design. Changes are made, the frame is re-rendered, the results are observed, more changes are made, the frame is re-rendered, etc., until the lighting artist and/or director is satisfied with the results. Because each render may take a number of hours to complete, the lighting process may be very time consuming and inefficient.

BRIEF DESCRIPTION OF THE DRAWINGS

Subject matter is particularly pointed out and distinctly claimed in the concluding portion of the specification. Claimed subject matter, however, both as to organization and method of operation, together with objects, features, and advantages thereof, may best be understood by reference of the following detailed description if read with the accompanying drawings in which:

DETAILED DESCRIPTION

Figure 1:
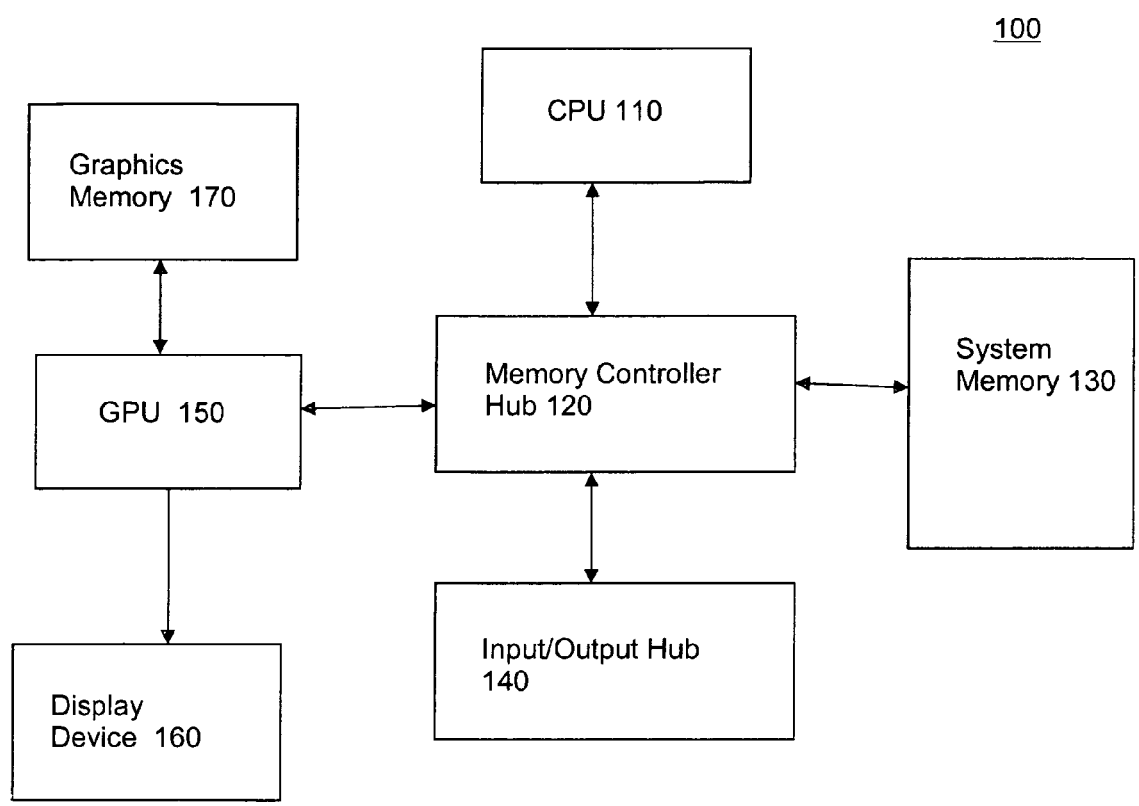
FIG. 1 is a block diagram of an example embodiment of a computing platform comprising a graphics processing unit.

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

As pointed out above, difficulties with state of the art technology, particularly in the area of re-lighting, for example, may include very time consuming and inefficient re-rendering of re-lit frames. A need, therefore, exists for techniques and/or systems that may accelerate the re-rendering of re-lit frames.

In accordance with an embodiment of a method for accelerating the re-rendering of a frame with lighting changes, information corresponding to one or more three-dimensional (3D) objects of a frame may be stored in an object-indexed cache. The 3D objects may be discretized into a plurality of points. The cache may include intermediate and/or final shading values that may be used in a re-render of the frame. A lighting change may be specified by a user, such as a lighting artist. A determination may be made as to which, if any, of the plurality of points are affected by the specified lighting change. For points affected by the lighting change, a determination may be made as to which shading operations are to be recalculated in order to implement the lighting change. The frame may be re-rendered using a combination of recalculated shading operations and at least a subset of the intermediate and/or final shading values stored in the object-indexed cache.

By storing intermediate shading results in a cache that is indexed by object, and by using the intermediate shading results where appropriate to re-render the frame, significant time savings may be realized during re-lighting operations. The significant time savings may provide a greatly improved, interactive re-lighting process that may be used to great advantage by animators, lighting artists, etc.

Reference throughout this specification to "one embodiment" or "an embodiment" means that a particular feature, structure, or characteristic described in connection with the embodiment is included in at least one embodiment of claimed subject matter. Thus, the appearances of the phrase "in one embodiment" and/or "an embodiment" in various places throughout this specification are not necessarily all referring to the same embodiment. Furthermore, the particular features, structures, and/or characteristics may be combined in one or more embodiments.

"Instructions" as referred to herein relate to expressions which represent one or more logical operations. For example, instructions may be "machine-readable" by being interpretable by a machine for executing one or more operations on one or more data objects, such as, for example, a processor. However, this is merely an example of instructions and claimed subject matter is not limited in this respect. In another example, instructions as referred to herein may relate to encoded commands which are executable by a processor or other processing circuit having a command set which includes the encoded commands. Such an instruction may be encoded in the form of a machine language understood by the processor or processing circuit. Again, these are merely examples of an instruction and claimed subject matter is not limited in these respects.

"Storage medium" as referred to herein relates to media capable of maintaining expressions which are perceivable by one or more machines. For example, a storage medium may comprise one or more storage devices for storing machine-readable instructions and/or information. Such storage devices may comprise any one of several media types including, for example, magnetic, optical and/or semiconductor storage media. However, these are merely examples of a storage medium and claimed subject matter is not limited in these respects.

"Logic" as referred to herein relates to structure for performing one or more logical operations. For example, logic may comprise circuitry which provides one or more output signals based at least in part on one or more input signals. Such circuitry may comprise a finite state machine which receives a digital input signal and provides a digital output signal, or circuitry which provides one or more analog output signals in response to one or more analog input signals. Such circuitry may be provided, for example, in an application specific integrated circuit (ASIC) and/or a field programmable gate array (FPGA). Also, logic may comprise machine-readable instructions stored in a storage medium in combination with a processor or other processing circuitry to execute such machine-readable instructions. However, these are merely examples of structures which may provide logic and claimed subject matter is not limited in these respects.

Unless specifically stated otherwise, as apparent from the following discussion, it is appreciated that throughout this specification discussions utilizing terms such as "processing," "computing," "calculating," "selecting," "forming," "enabling," "inhibiting," "identifying," "initiating," "querying," "obtaining," "maintaining," "representing," "modifying," "receiving," "transmitting," "storing," "authenticating," "authorizing," "hosting," "determining" and/or the like refer to the actions and/or processes that may be performed by a computing platform, such as a computer or a similar electronic computing device, that manipulates and/or transforms data represented as physical, electronic and/or magnetic quantities and/or other physical quantities within the computing platform's processors, memories, registers, and/or other information storage, transmission, reception and/or display devices. Accordingly, a computing platform refers to a system or a device that includes the ability to process and/or store data in the form of signals. Thus, a computing platform, in this context, may comprise hardware, software, firmware and/or any combination thereof. Further, unless specifically stated otherwise, a process as described herein, with reference to flow diagrams or otherwise, may also be executed and/or controlled, in whole or in part, by a computing platform.

A "computer program" as referred to herein relates to an organized list of instructions that, if executed, results in or causes a computer, computing device and/or machine to behave in a particular manner. Here, for example, a computer program may comprise machine-readable instructions that are executable to perform one or more desired tasks. In one particular embodiment, although claimed subject matter is not limited in this respect, a computer program may define input data and output data such that execution of the program may provide output data based, at least in part, on the input data. However, these are merely examples of a computer program and claimed subject matter is not limited in these respects.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct contact with each other, but yet may still cooperate and/or interact with each other.

As used herein, the term "and/or" may mean "and", it may mean "or", it may mean "exclusive-or", it may mean "one", it may mean "some, but not all", it may mean "neither", and/or it may mean "both", although the scope of claimed subject matter is not limited in this respect.

As used herein, the terms "render" and/or "rendering" and/or "re-render" and/or "re-rendering" are meant to include any of a wide range of techniques for producing an image based on three-dimensional data stored within a computing platform. The above terms may also signify the process of generating an image from a model, by means of a software program, although the scope of the claimed subject matter is not limited in this respect. The model may comprise a description of 3D objects in a data structure. The model may comprise geometry, viewpoint, surface and/or lighting information. These are merely examples of a model, and the scope of the claimed subject matter is not limited in this respect. The above terms may also be used to describe the process of calculating effects in a video editing file to produce final video output.

Further, as used herein, the terms "shader" and/or "shading" may refer to any process used in 3D computer graphics to determine surface properties of an object or image. Shaders may utilize information regarding light absorption, diffusion, texture mapping, reflection, refraction, shadowing, etc. "Shading" may further refer to how the color and brightness of a surface of an object may vary with lighting. These are merely examples of shading, and the scope of the claimed subject matter is not limited in this respect.

Also, as used herein, the terms "rasterization" and/or "rasterize" may refer to any process by which 3D objects are converted into pixels for eventual output to a display device. For one or more embodiments, rasterization and/or re-rasterization operations may be performed by a graphics processing unit, although the scope of the claimed subject matter is not limited in this respect.

Additionally, the term "cache" as used herein is meant to include any data structure capable of storing information used in a rendering process. An "object-indexed" cache may comprise a data structure that may be indexed on an object-by-object basis. That is, the information stored in the cache may be organized and/or accessed according to which object the information is associated. An object-indexed cache as used herein may also be referred to as a "grid cache." The term "grid" may refer to a grid of points associated with an object following a tessellation, or dicing, operation.

For one or more embodiments, an object-indexed cache may comprise any data structure capable of holding rendering results (perhaps object shading results), where each result may be accompanied by a list of zero or more input values that may affect the computation of that result. If a particular rendering result is needed for input values that match the input values stored in the cache, the correct result may be quickly retrieved from the cache, thus saving the time of re-computing the result.

For one or more embodiments, memory lookup operations may not be cached in an object-indexed cache. Final and/or intermediate rendering results may be cached. For an example embodiment, an object-indexed cache may comprise a table containing previously computed rendering results. If during a render of a frame a rendering result is needed, a determination may be made as to whether the needed result is present in the cache. If the needed result is present, the render of the frame may be accomplished more quickly than would be possible had the needed result not been present. If the needed result is not present in the cache, the needed result may be computed and the computed result may be stored in the cache for possible use in subsequent render operations.

For an embodiment, if memory resources are such that cache space is limited, older information stored in the cache may be discarded in order to store newer information. Further, for some embodiments, cache entries may be invalidated if an event occurs that affects the validity of the stored information. The invalidated information may be discarded and the invalidated information may be recomputed if needed in subsequent render operations. For example, if a lighting parameter is changed, cached results that are affected by that change may be discarded. A re-render may occur following the lighting parameter change, and the previously discarded results may be recomputed. For an embodiment, each cache entry may store the object name and the object rendering result (such as color, for example), and also a list of the input information upon which that result depends. Also, for one or more embodiments, an object-indexed cached that contains computed rendering results may be stored in system memory and/or graphics memory. Object-indexed caches may also be stored on non-volatile storage devices, such as disk drives. The above are merely examples of how an object-indexed cache may be organized and of what types of information may be stored in an object-indexed cache and of how such information may be utilized in a rendering process, and the scope of the claimed subject matter is not limited in these respects.

FIG. 1 is a block diagram of an example embodiment of a computing platform 100. Computing platform 100 may comprise a CPU 110 and a memory controller hub 120 coupled to CPU 110. Memory controller hub 120 is further coupled to a system memory 130, to a graphics processing unit (GPU) 150, and to an input/output hub 140. GPU 150 is further coupled to a display device 160, which may comprise a CRT display, a flat panel LCD display, a projector, or other type of display device. Also coupled to GPU 150 is a graphics memory 170. Platform 100 may also comprise one or more storage medium reading devices (not shown), perhaps coupled to input/output hub 140.

Although example system 100 is shown with a particular configuration of components, other embodiments are possible using any of a wide range of configurations. For example, embodiments are possible where a plurality of CPUs and/or GPUs are utilized. Further, the example embodiments described herein may be utilized in any of a wide range of electronic devices, including, but not limited to, computing platforms, gaming consoles and devices, etc. Further, for some embodiments a plurality of computing platforms may be coupled to operate together to perform the re-lighting acceleration techniques described herein.

Figure 2:
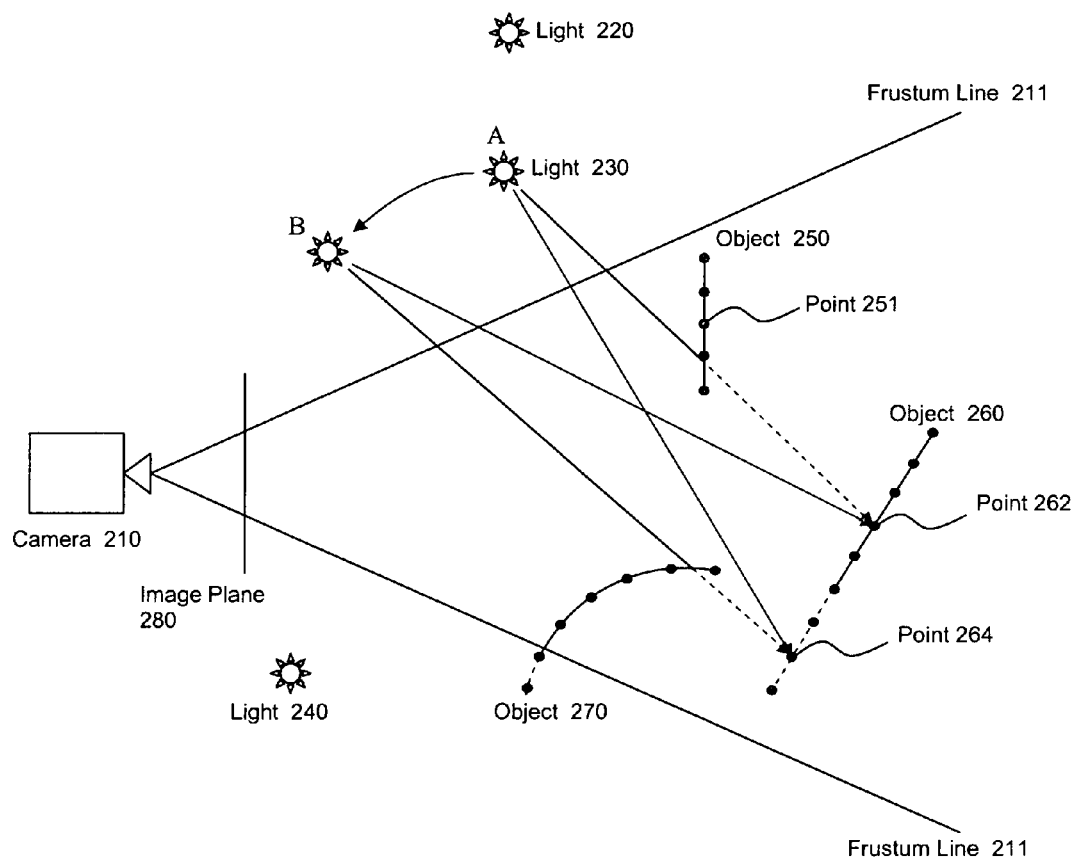
FIG. 2 is a diagram of an example scene comprising a plurality of light sources and a plurality of three-dimensional objects.

FIG. 2 is a diagram of an example scene comprising light sources 220, 230, and 240, as well as a plurality of three-dimensional objects 250, 260, and 270. Scene 200, although meant to represent a 3D graphics scene, is illustrated in two dimensions for ease of illustration and to simplify the discussion. Also depicted in FIG. 2 is a camera 210 (representing the point of view) and an image plane 280, onto which the 3D objects may be mathematically projected during a rasterization process. Frustum lines 211 are meant to illustrate the boundaries of the viewing frustum for scene 200.

For this example scene, the 3D objects 250, 260, and 270 may be tessellated (diced) to produce a mesh grid of points. The points of the various objects may be said to be discretized. Some example points, including points 251, 262 and 264, are depicted in FIG. 2.

In general, rendering may be thought of as a two-part process. For one part, visibility issues may be solved. For example, for a given point of view, for this example illustrated by camera 210, some objects or portions of objects may be occluded. Similarly, the various light sources may or may not affect each point of each object. Solving visibility issues may take into account the location and relationships of objects and light sources, and also the point of view. For example, several points on object 260 may not be visible to one or more of the light sources. See for example, points 262 and 264, where point 262 is not visible to light 230 while point 264 is visible. If light 230 is moved from position A to position B, the set of points that are exposed to the light may change. If light 230 is at location B, point 262 is visible to light 230 but point 264 is not.

For this example scene, the portions of objects 250, 260, and 270 that are occluded from the camera's point of view are illustrated with a dotted line. Portions of objects falling outside of the viewing frustum are similarly marked with a dotted line. Portions of light rays that are blocked by an object are also marked by dotted lines.

For a second part of the render process, the colors for each pixel (as projected onto image plane 280) may be determined/calculated. The shading process may take into account information regarding colors and/or textural patterns on the surface of the various objects, the intensity, location, and color of light sources, relative closeness of objects, etc. Of course, these are merely examples of the types of information that may be used in the rendering process.

Figure 3:
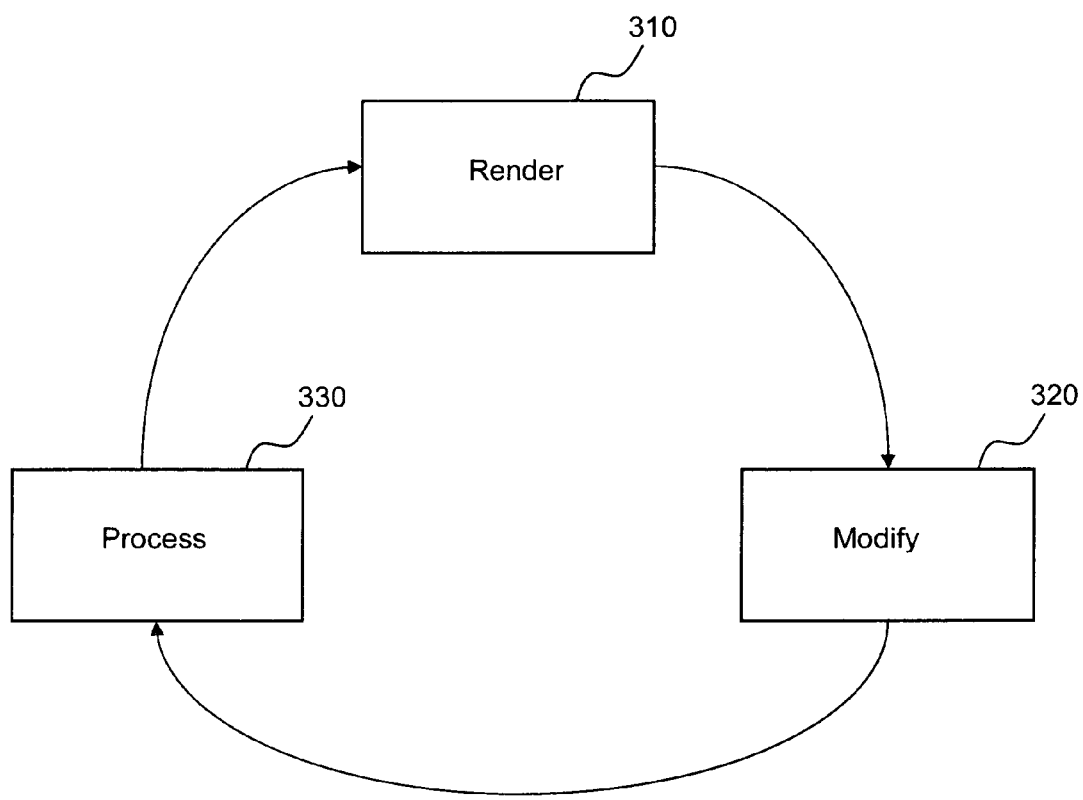
FIG. 3 is a diagram of an example embodiment of an interactive re-lighting process.

FIG. 3 is a diagram of an example embodiment of an interactive re-lighting process. At block 310, a frame may be rendered. At block 320, modifications may be made to the frame, perhaps in this example to one or more lighting parameters. The changes may be specified by an artist, such as a lighting artist, animator, or other user. Processing may take place at block 330 to prepare the frame, including the modified lighting parameters, for rendering, and a new render may occur at block 310 using the modified, processed light information. The cycle may be repeated as many times as desired until the artist is satisfied with the results.

Figure 4:
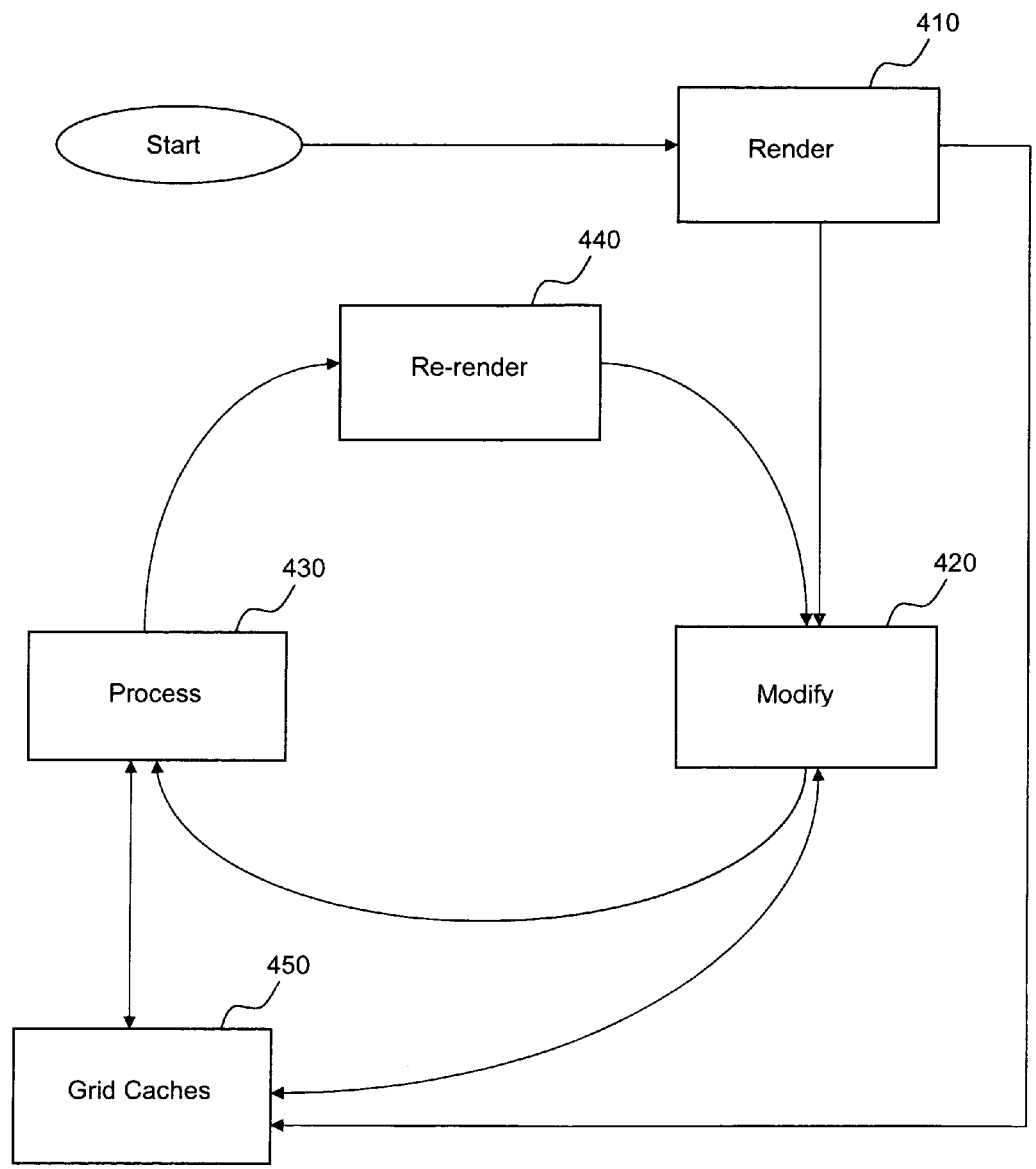
FIG. 4 is a flow diagram of an example embodiment of a method for accelerating the re-rendering of a frame.

FIG. 4 is a flow diagram of an example embodiment of a method for accelerating the re-lighting of a frame. At block 410, a render of the frame may occur. This render may comprise an initial render of the frame. For the initial render, a determination may be made as to which object or portions of objects are visible, as well as performing other rendering operations. The initial render may also comprise an initial importing of scene data. Some or all of the results of the initial render may be stored in one or more grid caches 450.

At block 420, modifications may be made to one or more lighting parameters. Processing may take place at block 430 to prepare the frame for re-rendering at block 440. However, for the re-render, if only one or some lights are moved or otherwise changed, only computations affected by the changes are re-performed. For computations not affected by the lighting changes, information stored in one or more of the grid caches 450 are used, thereby greatly reducing the amount of calculations required to perform the re-render. For example, because the changes involve only one or more lights (the camera is not moved), it is not necessary to re-perform the visibility operations performed at the initial render.

Thus, for this and other example embodiments, work and time may be saved by only re-sending the lights for re-render (not re-exporting and re-reading the entire scene), not considering objects that weren't visible in the initial render (information regarding which objects are visible and which are not may be stored in one or more grid caches), and caching the values of various shading operations so that only operations affected by a lighting change need to be recomputed, and other operations may reuse their results from the previous render. In this manner, a full-featured, largely interactive re-render with greatly improved performance and/or efficiency is possible. For this and other embodiments, the accelerated re-render may be pixel-for-pixel the same as with a full render (the resulting images may be identical).

Figure 5:
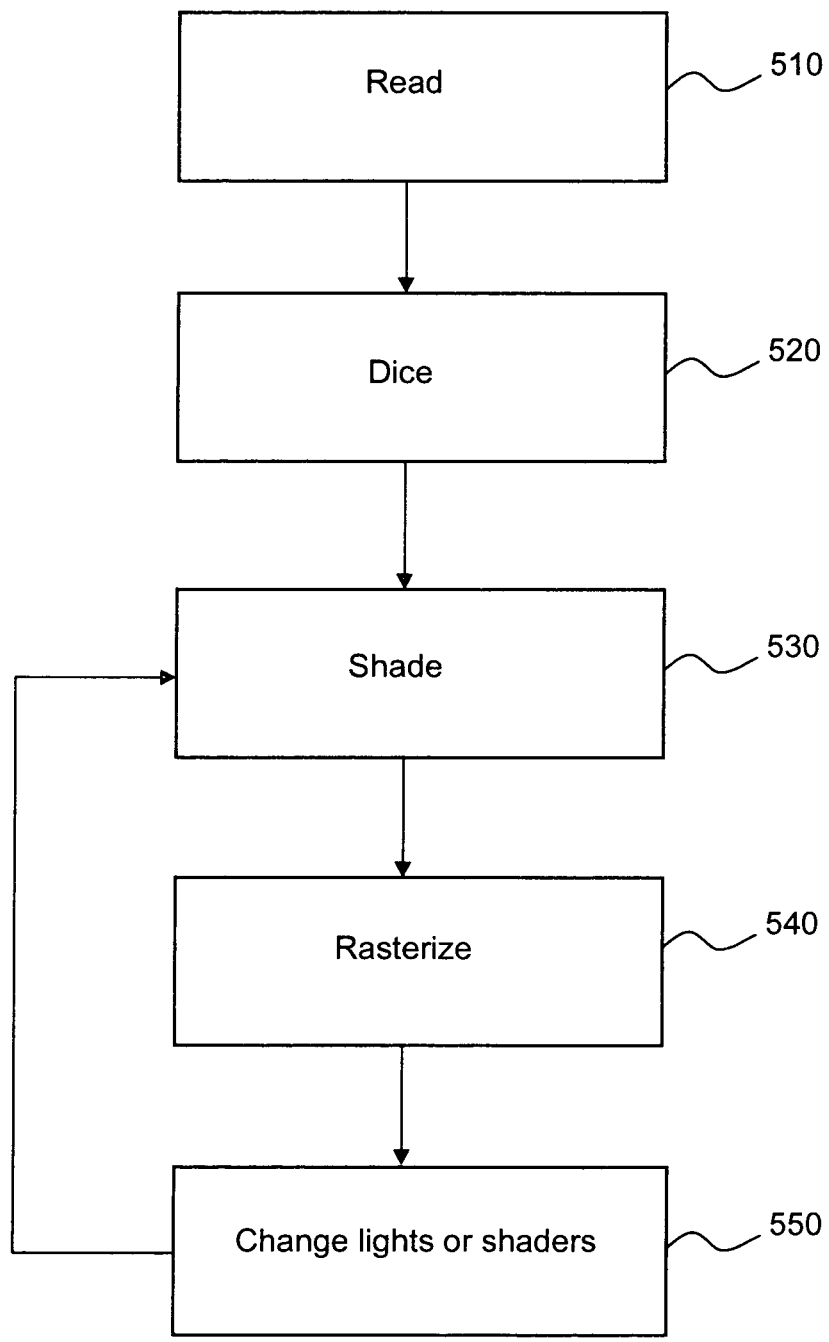
FIG. 5 is a flow diagram of an additional example embodiment of a method for accelerating the re-rendering of a frame.

FIG. 5 is a flow diagram of an additional example embodiment of a method for accelerating the re-lighting of a frame. For this example embodiment, scene data may be read at block 510. At block 520, dicing (tessellating) operations may be performed on the objects of the scene. At block 530, shading operations may be performed, and at block 540 the image may be rasterized. At block 550, changes to one or more lighting or shading parameters may be specified. Processing may then return to block 530. Rather than re-performing all of step 530, operations that are necessitated by the changed parameters are re-performed, thus saving time and improving efficiency. An embodiment in accordance with claimed subject matter may include all, more than all, or less than all of blocks 510-550. Furthermore, the order of blocks 510-550 is merely one example order, and the scope of the claimed subject matter is not limited in this respect.

Figure 6:
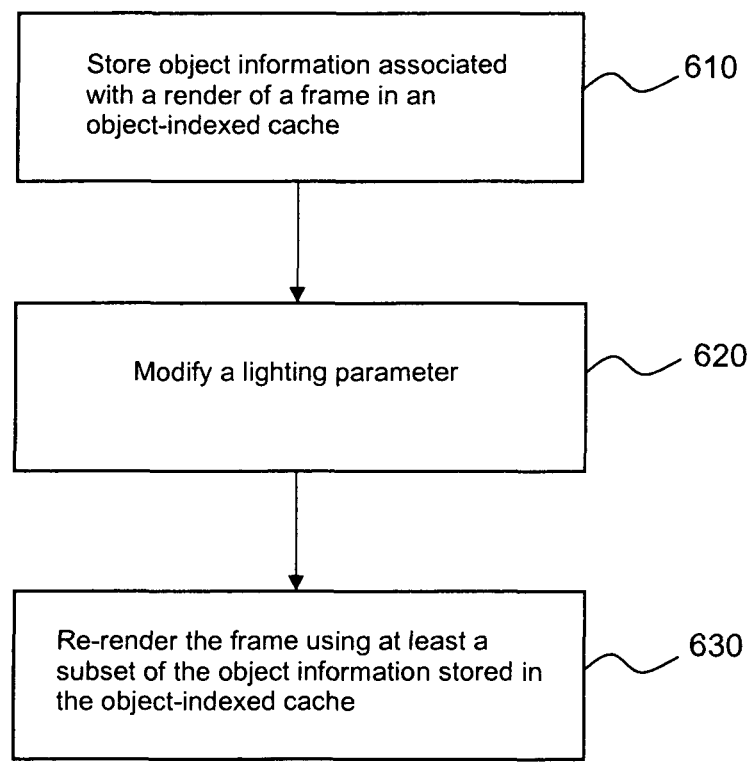
FIG. 6 is a flow diagram of an additional example embodiment of a method for accelerating the re-rendering of a frame.

FIG. 6 is a flow diagram of an example embodiment of a method for accelerating the re-rendering of a frame. At block 610, object information associated with a render of a frame may be stored in an object-indexed cache, and at block 620, a lighting parameter may be modified. At block 630, the frame may be re-rendered using at least a subset of the object information stored in the object-indexed cache. An embodiment in accordance with claimed subject matter may include all, more than all, or less than all of blocks 610-630. Furthermore, the order of blocks 610-630 is merely one example order, and the scope of the claimed subject matter is not limited in this respect.

Figure 7:
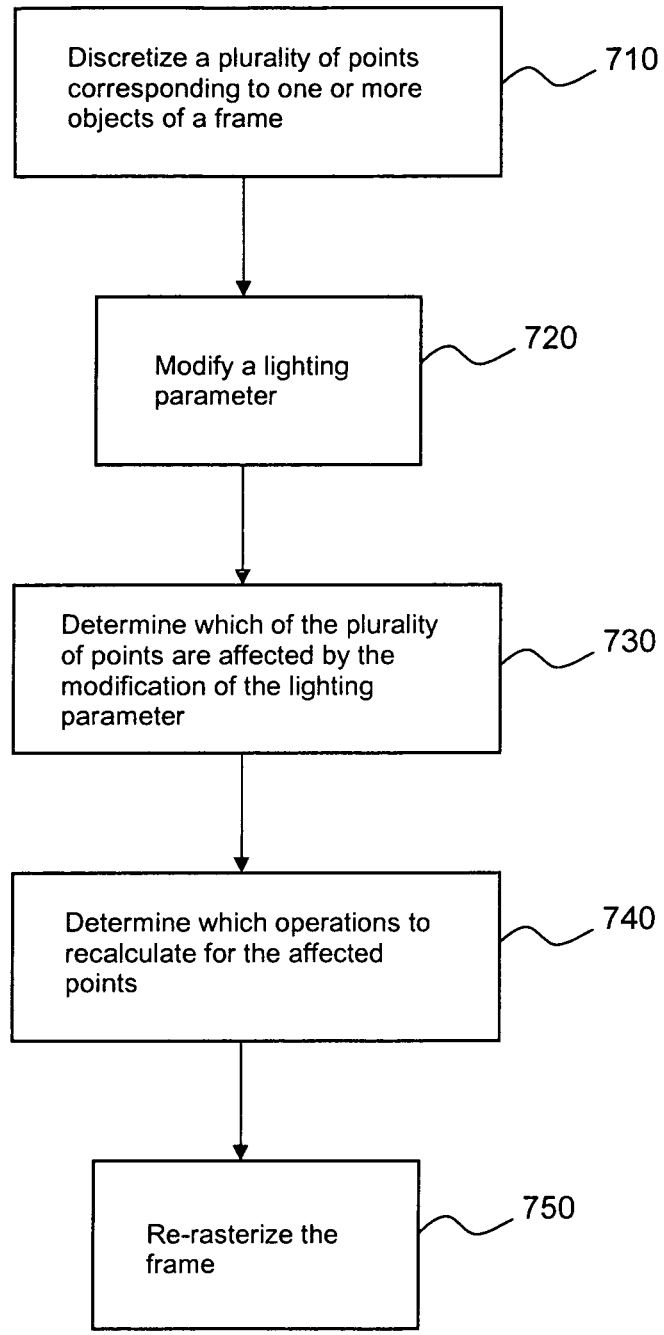
FIG. 7 is a flow diagram of an additional example embodiment of a method for accelerating the re-lighting of a frame.

FIG. 7 is a flow diagram of an additional example embodiment of a method for accelerating the re-lighting and re-rendering of a frame. At block 710, a plurality of points may be discretized, wherein the plurality of points correspond to one or more objects of the frame. At block 720, a lighting parameter may be modified. At block 730, a determination may be made as to which of the plurality of points are affected by the modification of the lighting parameter, and at block 740 a determination may be made as to which operations to recalculate for the affected points. At block 750, the frame may be re-rasterized. An embodiment in accordance with claimed subject matter may include all, more than all, or less than all of blocks 710-750. Furthermore, the order of blocks 710-750 is merely one example order, and the scope of the claimed subject matter is not limited in this respect.

Figure 8:
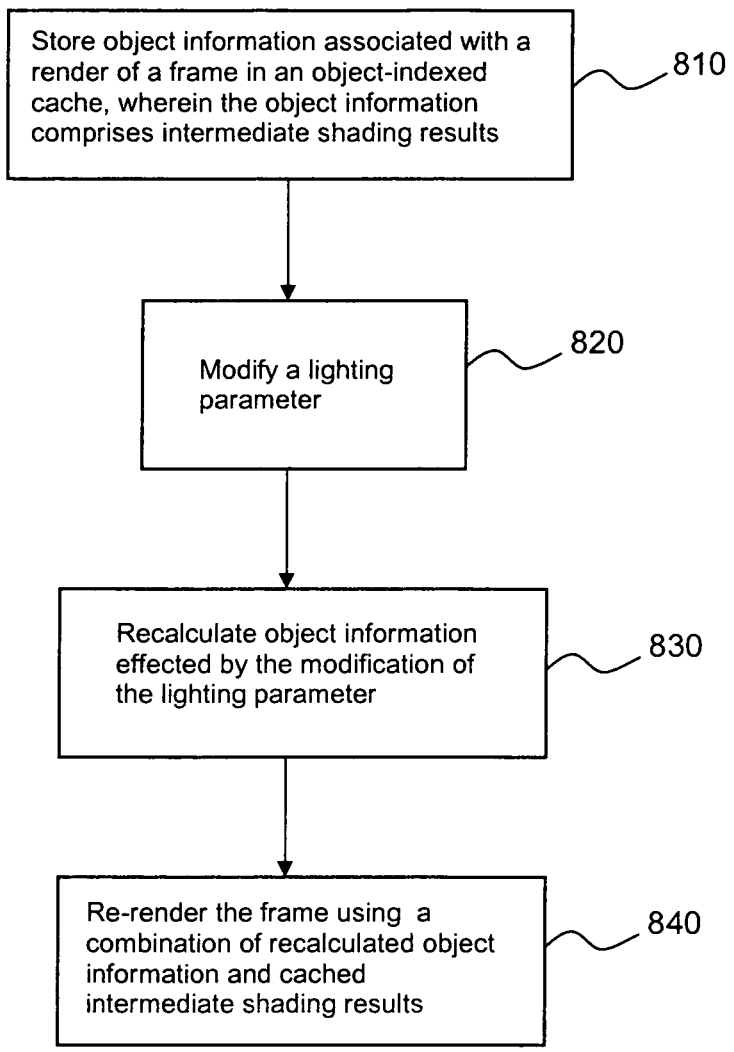
FIG. 8 is a flow diagram of an example embodiment of a method for accelerating the re-lighting of a frame comprising storing object information associated with a render of a frame in an object-indexed cache.

FIG. 8 is a flow diagram of an example embodiment of a method for accelerating the re-lighting of a frame comprising storing object information associated with a render of a frame in an object-indexed cache. At block 810, the object information may be stored in the object-indexed cache. The object information may comprise intermediate shading results. At block 820, a lighting parameter may be modified. At block 830, object information affected by the modification of the lighting parameter may be re-calculated. At block 840, the frame may be re-rendered using a combination of re-calculated object information and cached intermediate shading results. An embodiment in accordance with claimed subject matter may include all, more than all, or less than all of blocks 810-840. Furthermore, the order of blocks 810-840 is merely one example order, and the scope of the claimed subject matter is not limited in this respect.

Figure 9:
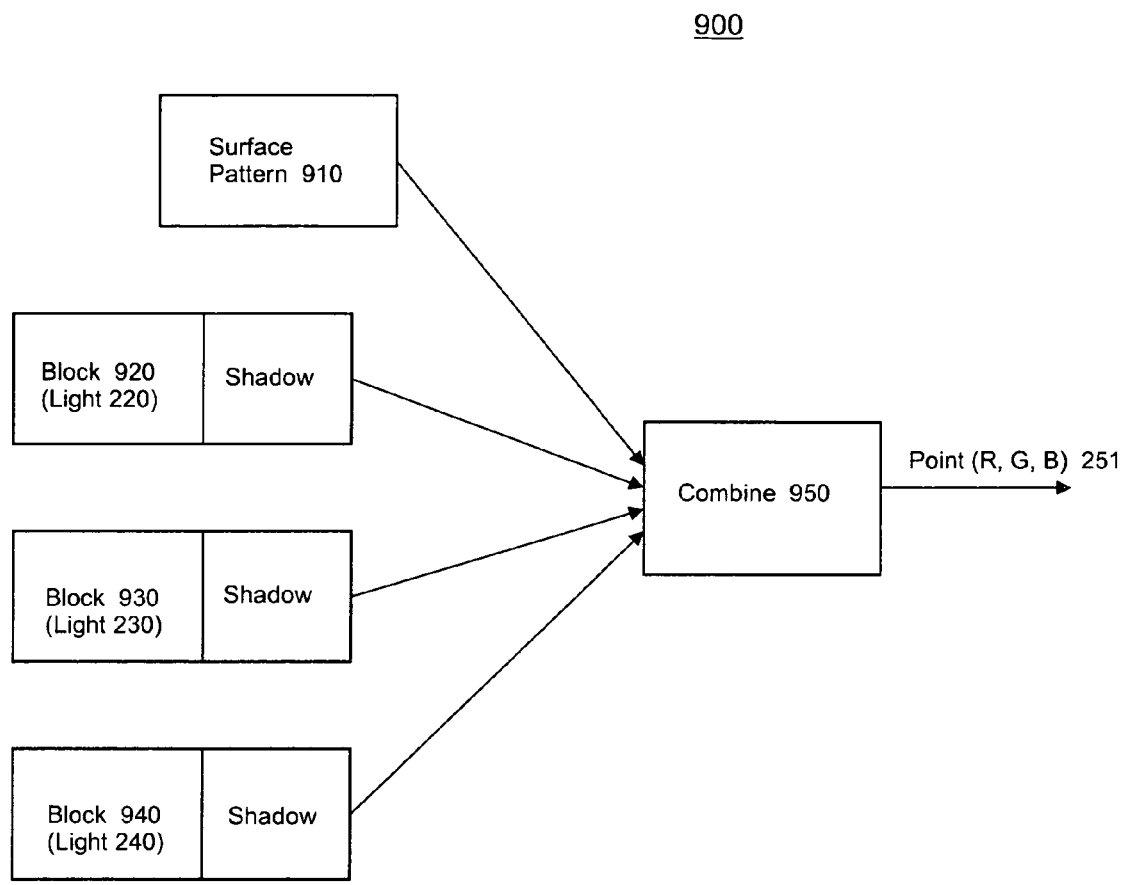
FIG. 9 is a diagram depicting blocks of information for a plurality of lights associated with a point on an object.

FIG. 9 is a diagram depicting example blocks of information for a plurality of lights associated with a point on an object. For this example embodiment, the example point comprises point 251. The blocks of information depicted in FIG. 9 represent possible information associated with object 250, and point 251 in particular, that may be stored in a cache. Block 910 may comprise surface pattern information. Light block 920 may comprise information related to light source 220, light block 930 may comprise information related to light source 230, and light block 940 may comprise information related to light source 240. Each of the light sources may have associated with it shadow map information. A combine unit 950 may be implemented in hardware, software, or a combination of hardware and software. Referring again to FIG. 2, following an initial render of scene 200, light source 230 may be moved from position A to position B. For this example, in performing a re-render of the scene following the light change, points and calculations that are affected by the light change are recalculated. For this example, for point 251, the surface pattern information and the information for lights 220 and 240 are not effected by the lighting change. Therefore, information from blocks 910, 920, and 940 may be provided to combine unit 950. However, light block 930, associated with light source 230, may comprise information that is affected by the lighting change, and at least a subset of the information stored at block 930 may be recalculated. The recalculated information may be provided to combine unit 950 which may produce color data for point 251. The example data organization depicted in FIG. 9 is merely an example organization, and the claimed subject matter is not limited in this respect.

Figure 10:
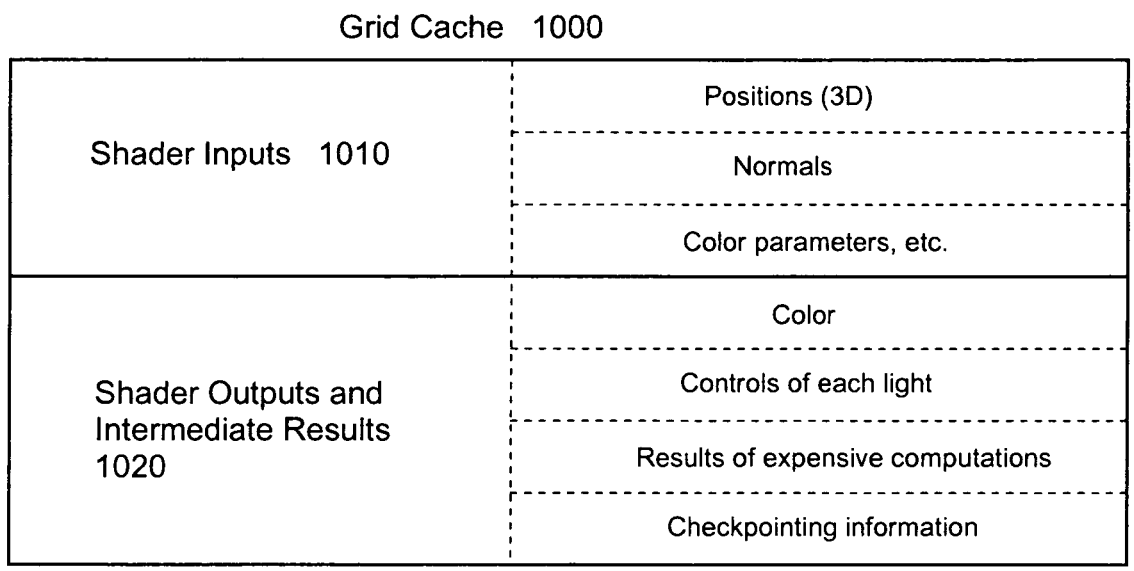
FIG. 10 is a block diagram of an example embodiment of a grid cache.

FIG. 10 is a block diagram of an example embodiment of a grid cache 1000. As previously mentioned, the term "grid cache" may refer to a data structure that may be indexed according to one or more objects and/or points of an object. For this example, grid cache 1000 may comprise shader input data 1010 and shader output and intermediate result data 1020. Shader input data 1010 may comprise information regarding the position of an object, normal information, color parameters, etc. Shader output and intermediate result data 1020 may comprise color information, light control parameter information, results of expensive computations, check-pointing information, etc. Caches related to embodiments described herein may be stored in graphics memory, system memory, and/or non-volatile storage, such as a hard drive for example, or in a combination of the above. Of course, this is merely one possible example of a grid cache, and the scope of the claimed subject matter is not limited in this respect.

For an embodiment, results of individual shader operations may be cached, in addition to caching the final results of individual lights and/or pre-lit surface patterns. Additionally, for an example embodiment, the kinds of instructions to be cached may be specified by a software developer. For some embodiments, the kinds of instructions to be cached may be specified by a user. Determinations as to which kinds of instructions to cache may be based on user preference and/or computing platform resource availability (for example, available memory). Such determinations may be predetermined or may be made dynamically and/or automatically, perhaps depending on available resources. For some embodiments, it may be advantageous to cache instructions that are expensive in that they are especially time and/or resource consuming. For example, the results of texture lookup operations may be cached. Also for some embodiments, specific instructions and/or specific parameters may be cached. These are merely examples of kinds of information that may be cached and/or how the determinations may be made, and the scope of the claimed subject matter is not limited in these respects.

For one or more embodiments, caches and/or cache entries may be identified by a name that is created by concatenating all of the input parameters of an instruction for a grid point. However, this is merely an example of how a cache or cache entry may be identified, and the scope of the claimed subject matter is not limited in this respect.

Some embodiments may employ a prioritized list of operations to be cached. The list may range from high priority operations to low priority operations. The high priority operations may comprise those operations that are especially time consuming to compute, and the low priority operations may comprise those operations that are relatively quickly recomputed. There may be a wide range of intermediate priority levels between the high and low priority levels. This listing of prioritized operations may comprise a sliding scale of computation-versus-memory tradeoffs for the cache. For example, as memory resources become more scarce, more of the lower priority operations may be automatically recomputed rather than cached. The determination of which operations to recompute and of which operations to cache may be made automatically, or in other embodiments a user may specify which priority levels of operations to cache and which to recompute. The user may be provided a menu item in a software application by which the user may indicate his or her preference regarding which operations to cache.

Figure 11:
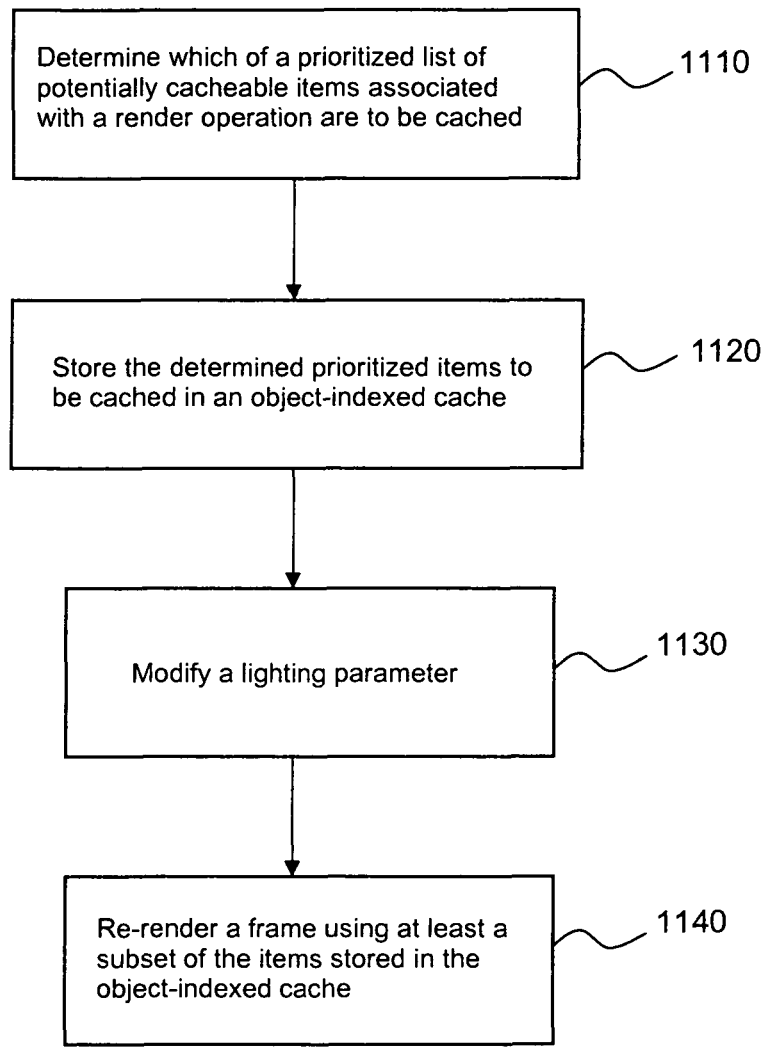
FIG. 11 is a flow diagram of an example embodiment of a method for determining which of a prioritized list of items associated with a render operation are to be cached.

FIG. 11 is a flow diagram of an example embodiment of a method for determining which of a prioritized list of items are to be cached. At block 1110, a determination is made as to which of a prioritized list of potentially cacheable items associated with a render operation are to be cached. As described above, the determination may be based on a range of considerations, including, but not limited to, the availability of computing platform resources such as memory. The term "items" in this context is meant to include any information that may be stored in a cache, including information types described above. Expensive operations (time and/or resource consuming) may be given top priority and may be cached while lower priority operations (operations that may be easily recalculated) may not be cached in some circumstances, for example where memory resources are scarce.

At block 1120, the prioritized items that are selected for caching are stored in an object-indexed cache. At block 1130, a lighting parameter may be modified, and at block 1140, a frame may be re-rendered using at least a subset of the items stored in the object-indexed cache. An embodiment in accordance with claimed subject matter may include all, more than all or less than all of blocks 1110-1140. Furthermore, the order of blocks 1110-1140 is merely one example order, and the scope of the claimed subject matter is not limited in this respect.

Caches and/or cache entries in some circumstances may depend at least in part on an external file, such as a shadow map, for example. For an embodiment, if the external file is modified, instructions that depend on that external file may be automatically recomputed.

Figure 12:
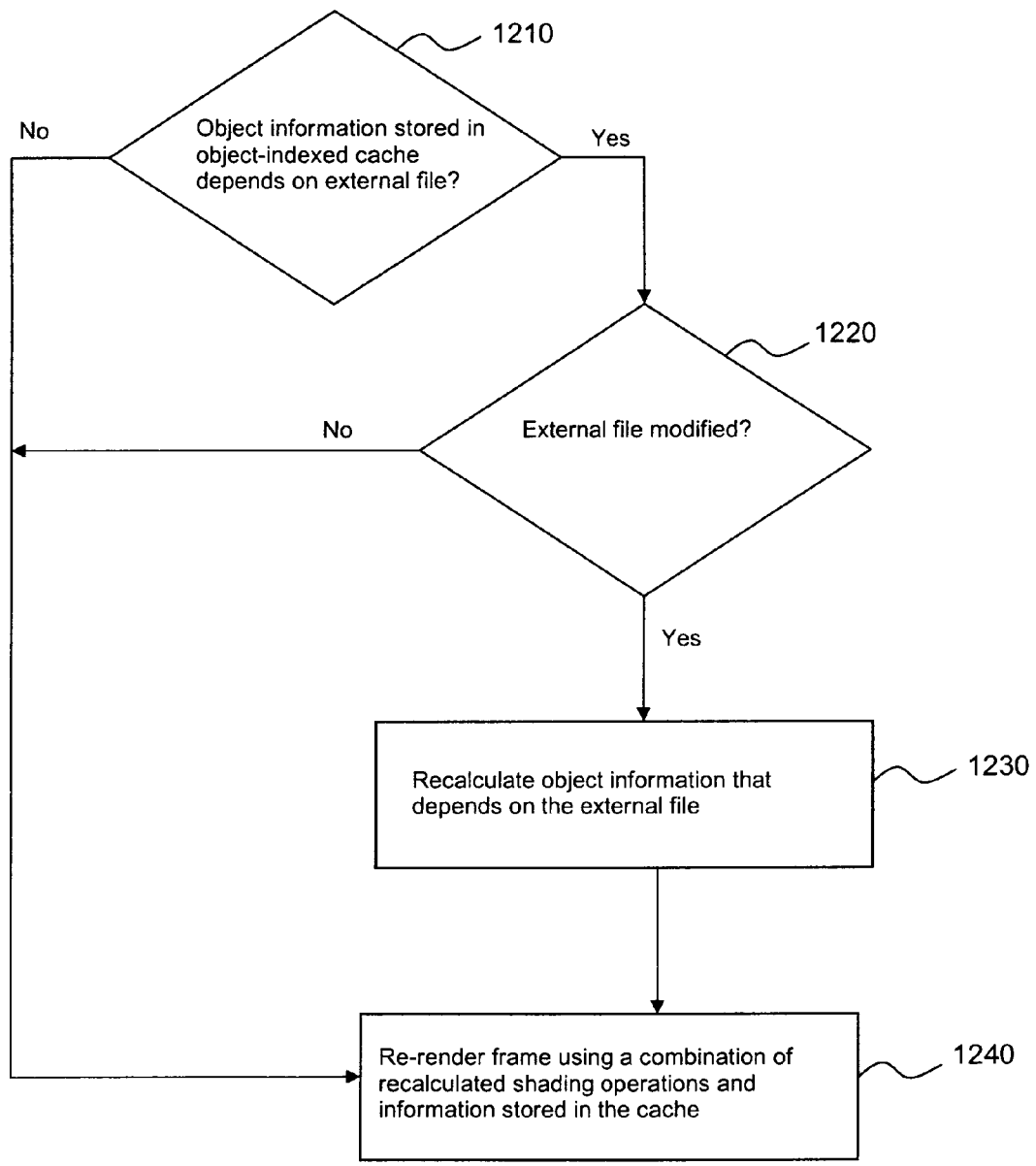
FIG. 12 is a flow diagram of an example embodiment of a method for recalculating cached object information that depends on a modified external file.

FIG. 12 is a flow diagram of an example embodiment of a method for recalculating object information that depends on a modified external file. At block 1210, a determination may be made as to whether object information stored in an object-indexed cache depends on an external file. If no object information depends on an external file, processing proceeds to block 1240. If object information stored in the object-indexed cache does depend on an external file, a determination is made at block 1220 as to whether the external file has been modified. If the external file has not been modified, processing proceeds to block 1240. If the external file has been modified, at block 1230 object information that depends on the modified file is recalculated. At block 1240, a frame is re-rendered using a combination of recalculated shading operations and information stored in the cache. An embodiment in accordance with claimed subject matter may include all, more than all or less than all of blocks 1210-1240. Furthermore, the order of blocks 1210-1240 is merely one example order, and the scope of the claimed subject matter is not limited in this respect.

When a lighting artist or other user is making changes to lights or other elements of a scene, it is often the case where the artist will make several changes to a light or other element before he or she is satisfied with the results. If the artist must wait for a full-fidelity render in between changes, the process may be very time-consuming. The re-render acceleration techniques and methods described herein may make the process much less time-consuming. For some embodiments, the process may be sped up even further by progressive refinement of a scene. As used herein, the term "progressive refinement" is meant to comprise techniques for initially displaying a scene at less than full fidelity then following up with a higher-fidelity or full-fidelity representation of the scene. With progressive refinement, an artist may be able to determine from the lower-fidelity version of the scene whether the recent changes are likely to be satisfactory. This determination may be made in a very timely manner, rather than waiting for the higher-fidelity or full-fidelity version.

For an example embodiment, the lower-fidelity representation may be based on the scene having been diced more coarsely than may be the case for a full-fidelity render. In other words, each object of a scene for the lower-fidelity representation may be discretized into fewer points than would be the case for a full-fidelity render. For an embodiment, the eventual rasterization of the lower-fidelity scene may occur at full pixel resolution. For other embodiments, the lower-resolution render may be sped up further by limiting pixel resolution and/or by eliminating some functions, such as, for example, anti-aliasing and/or blurring. By maintaining full pixel resolution for the lower-fidelity render, the inherent blocky appearance of lower pixel resolution displays may be avoided, giving the artist a better idea of what the full-fidelity render is likely to look like.

For some embodiments, the lower-fidelity render may be displayed, and subsequently the higher-fidelity render may be overlaid on top of the lower-fidelity display. The higher-fidelity render may replace the lower-fidelity version region-by-region as higher-fidelity regions become available until the entire display has been updated with the higher-fidelity version. For example, in one embodiment, a display may be updated top-to-bottom, or bottom-to-top, or left-to-right, or right-to-left, or the update may occur first at a region designated by the artist. Of course, these are merely examples of how the lower-fidelity display may be updated with the higher-fidelity display, and the scope of the claimed subject matter is not limited in these respects. Further, for some embodiments, the re-render process (whether lower-fidelity or higher-fidelity) may be interrupted at any point by the user.

As used herein, the terms "region" and/or "regions" are meant to denote any subset of a scene, frame, and/or display. Regions may comprise any of a wide range of shapes and/or sizes. Regions may comprise pixels, objects, and/or other data structure.

For some embodiments, a user may specify which regions of the scene or frame to re-render first. For example, the user may specify a rectangular portion of the frame to re-render first. Alternatively, in another embodiment, the user may specify a coordinate of the frame (perhaps by selecting a point on the display using a pointing device) and the regions immediately surrounding the selected coordinate may be rendered and then other regions of the frame extending out from the coordinate in a spiral fashion may be rendered. For one embodiment, a lower-priority render of the frame may be performed for the entire frame, then a higher-priority render of the frame may commence at the region or point specified by the user. However, these are merely examples of the order in which regions of the frame may be rendered, and the scope of the claimed subject matter is not limited in these respects.

In order to take advantage of the re-render acceleration properties made possible by the techniques and methods described herein, two copies of any particular scene may be stored. One copy may represent a lower-fidelity version of the scene and the other copy may represent a higher and/or full-fidelity version. Each of the copies may maintain object-indexed caches as described above to enable accelerated re-rendering of the scene.

Although for the above example embodiment two levels of fidelity are discussed (along with two corresponding scene copies), the scope of the claimed subject matter is not so limited, and other embodiments may utilize less than or more than two fidelity levels.

Figure 13:
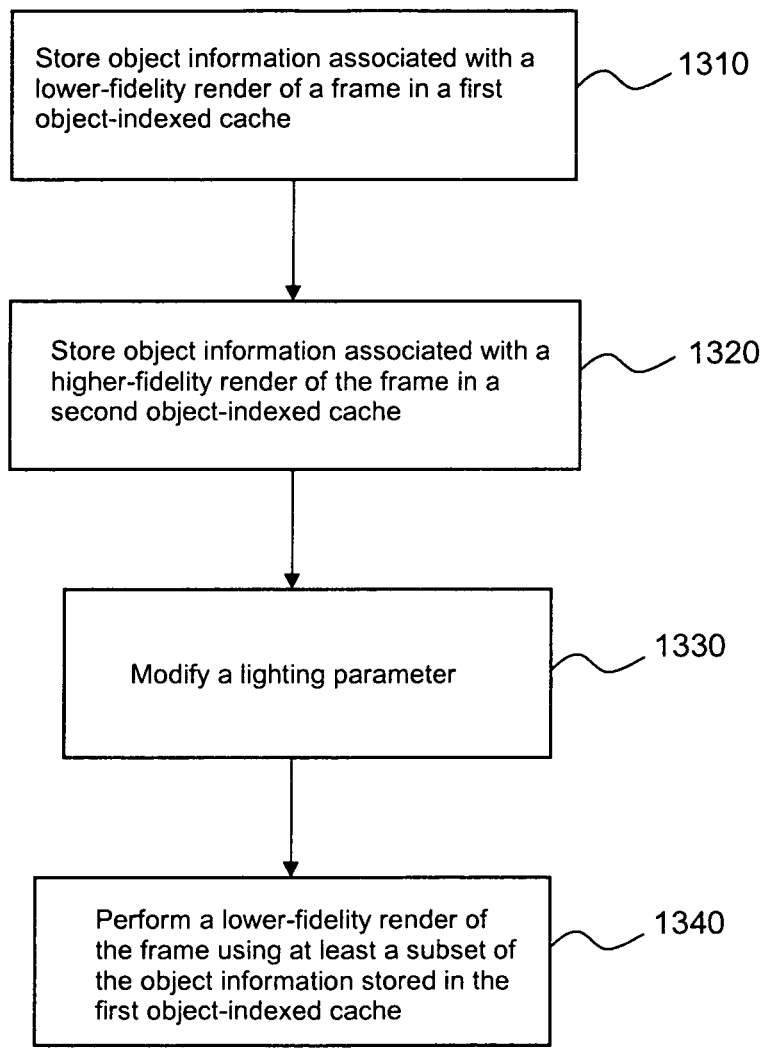
FIG. 13 is a flow diagram of an example embodiment of a method for performing a lower-fidelity render.

FIG. 13 is a flow diagram of an example embodiment of a method for performing a lower-fidelity render. At block 1310, object information associated with a lower-fidelity render of a frame is stored in a first object-indexed cache. At block 1320, object information associated with a higher-fidelity render of the frame may be stored in a second object-indexed cache. A lighting parameter may be modified at block 1330, and at block 1340 a lower-fidelity render of the frame may be performed using at least a subset of the object information stored in the first object-indexed cache. An embodiment in accordance with claimed subject matter may include all, more than all or less than all of blocks 1310-1340. Furthermore, the order of blocks 1310-1340 is merely one example order, and the scope of the claimed subject matter is not limited in this respect.

Figure 14:
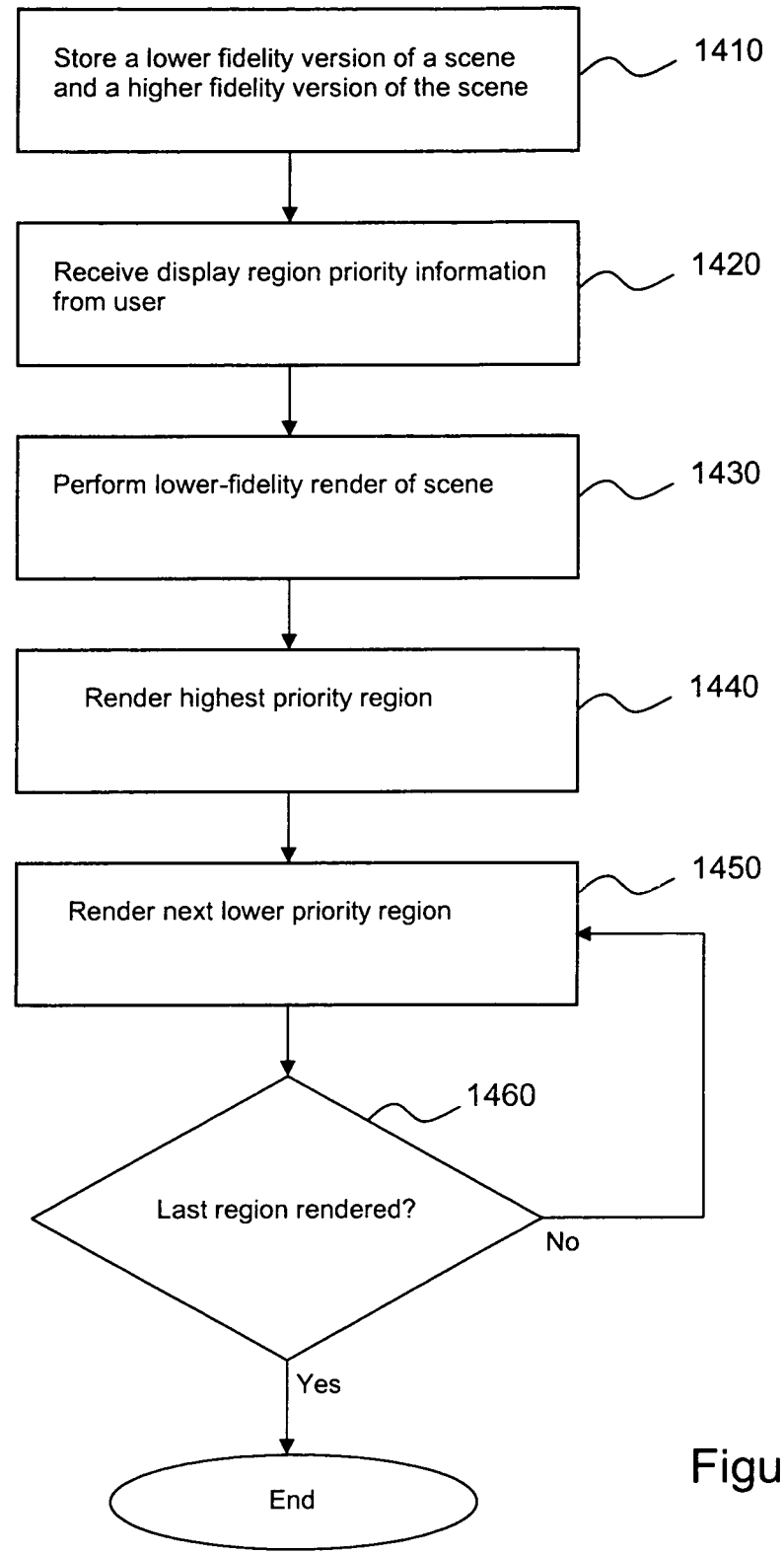
FIG. 14 is a flow diagram of an example embodiment of a method for progressively refining a render of a scene.

FIG. 14 is a flow diagram of an example embodiment of a method for progressively refining a render of a scene. At block 1410, lower-fidelity and higher-fidelity versions of a scene are stored. The object information associated with the two versions of the scene may be stored in object-indexed caches. At block 1420, display region priority information may be received from a user. The priority information from the user may comprise an indication of which region or regions are to be rendered at the higher fidelity first. Some possible schemes for prioritizing regions are described above, although the scope of the claimed subject matter is not limited in these respects. A lower-fidelity render of the scene may be performed at block 1430, and at block 1440 the highest priority region may be rendered at a higher fidelity. At block 1450, the next lower priority region may be rendered, also at the higher fidelity. A determination may be made at block 1460 as to whether the last region has been rendered. If not, processing returns to block 1450 where the next lower priority region is rendered. If the last region has been rendered, processing ends. An embodiment in accordance with claimed subject matter may include all, more than all or less than all of blocks 1410-1460. Furthermore, the order of blocks 1410-1460 is merely one example order, and the scope of the claimed subject matter is not limited in this respect.

As discussed above, for some embodiments a user may indicate which region of a scene to render first, or which regions are of a higher priority. For some embodiments, the user may interrupt the render and select and/or reselect a region to be rendered next. For example, a user may make a change to a lighting parameter, and the user may desire to see the effect of the lighting change in a particular region of the frame. The user may initially select a region to be rendered first. For some embodiments, the user may also later select another region of the frame to be rendered next. That is, the user may interrupt the current render operation and re-prioritize the order in which the rendering will occur for the various regions of the frame.

In addition to re-prioritizing the order in which the rendering will occur for the various regions of the frame, for one or more embodiments a user may interrupt the render at any point and make changes to lighting parameters. The render operation may then restart automatically for some embodiments or manually in others, and again the user may have the ability to prioritize the order in which regions of the frame are to be rendered.

For an example embodiment, the render of the frame, whether it be an initial render or a re-render, may be interrupted at any point. For example, for some embodiments one or more object-indexed caches may be initialized during an initial render of a frame. For an example embodiment, a user may make lighting changes during the initial render before all of the caches have been created. In response to a change in lighting parameters, a re-render operation may occur using the caches that were created during the initial render (in this example a partial render) of the frame. The re-render operation may also initialize additional caches that were not initiated during the initial render of the frame.

For one example, a render of a frame (may be an initial render or a re-render) may start with a lower-fidelity representation of the scene, as described above. The user may be able to discern from the lower-fidelity display that lighting changes may be desirable. The user may make the changes without waiting for the full-fidelity render to be completed. For an embodiment, the user may interrupt the render of the frame as often as desired, and the render operation may automatically recommence in response to the change in lighting parameters. For an embodiment, the render operation may be manually restarted. For some embodiments and as described above, a determination may be made as to which operations are affected by the lighting parameter change, and those operations may be recomputed while the results of unaffected operations may be retrieved from an appropriate cache. In some instances; if the user interrupts the render before a cache has been created for one or more operations, those operations may also be computed and the appropriate object-indexed caches created. Of course, these are merely examples of interrupting a render of a frame, and the scope of the claimed subject matter is not limited in these respects.

Figure 15:
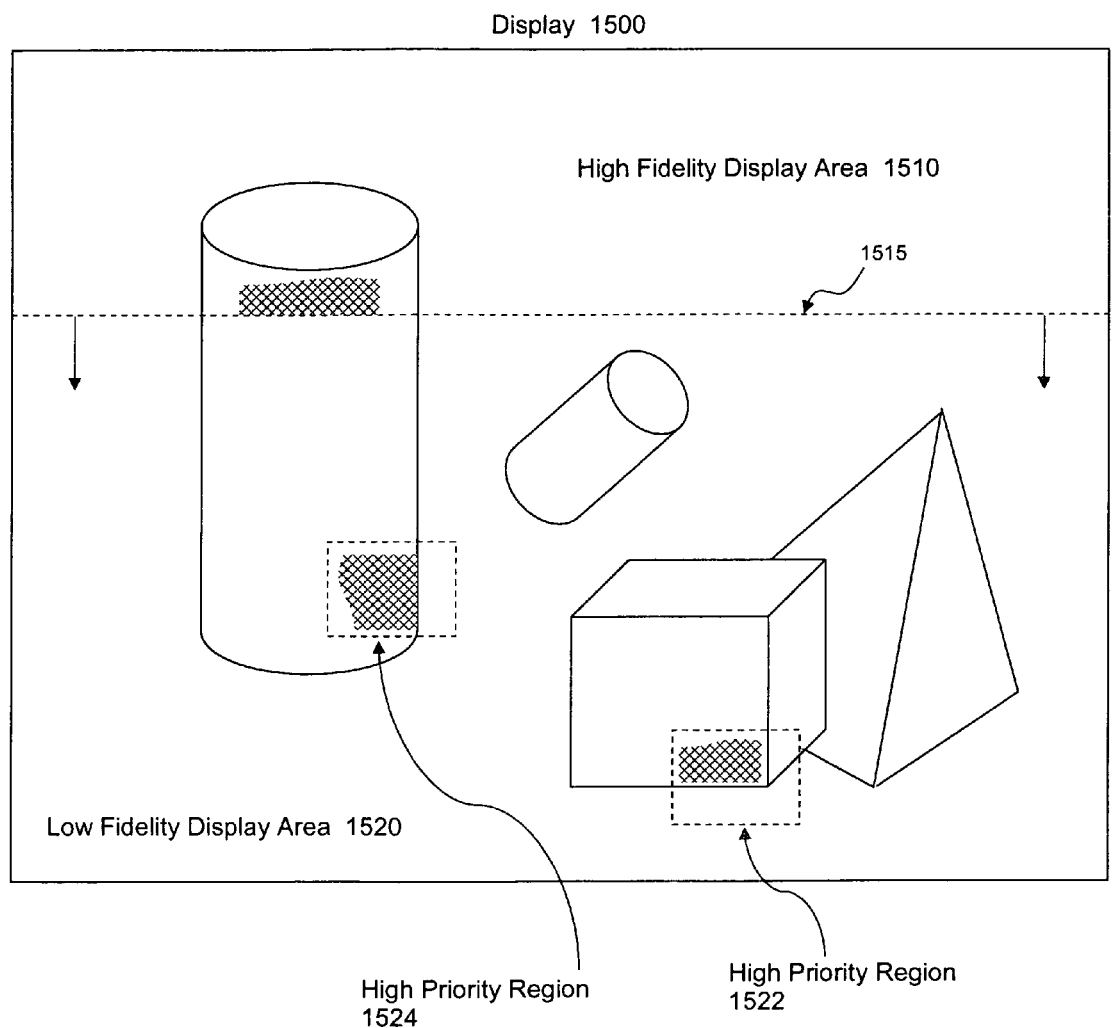
FIG. 15 is a diagram of an example display depicting a scene being rendered by lower-fidelity and higher-fidelity processes.

FIG. 15 is a diagram of an example display 1500 depicting a scene being rendered by lower-fidelity and higher-fidelity processes. For this example, the scene has been initially rendered using a lower-fidelity process, perhaps according to embodiments discussed above. A higher-fidelity render for this example may be performed beginning at the top of the scene and proceeding down the display, as depicted in the figure by the horizontal dotted line 1515 and associated arrows. For this example, the area 1510 above line 1515 has been re-rendered at a higher fidelity. The area 1520 below line 1515 represents an area that has been previously rendered at a lower fidelity and is awaiting the higher-fidelity render. Portions of the display 1500 that are cross-hatched are meant to depict areas with increased surface detail resulting from the higher-fidelity render.

As discussed previously, for some embodiments a user may re-prioritize or interrupt the rendering process. For example, the user may make changes to one or more lighting parameters. For this example, the current in-process render may stop and restart in response to the change in lighting parameter. Alternatively, as another example, the user may desire to focus on a particular region of the display and may direct that the higher-fidelity render be performed for that region before remaining regions are rendered. For the example depicted in FIG. 15, while a higher-fidelity render is underway, the user may select region 1522. Region 1522 may be treated as a high priority region and may be processed before remaining regions within the low fidelity display area 1520. Once region 1522 has been rendered at the higher fidelity, the rendering process may continue its top-to-bottom pattern for this example. The user may then desire to again interrupt the top-to-bottom pattern and may select region 1524 to be processed next. The user may continue to interrupt the render process any number of times, either to make changes to any of a range of parameters, including but not limited to lighting parameters, or to reprioritize the order in which the regions of the display are to be rendered.

Although the example of FIG. 15 depicts top-to-bottom processing of regions, and although the high-priority regions selected by the user are shown as rectangular regions, these are merely examples, and the scope of the claimed subject matter is not limited in these regards.

Figure 16:
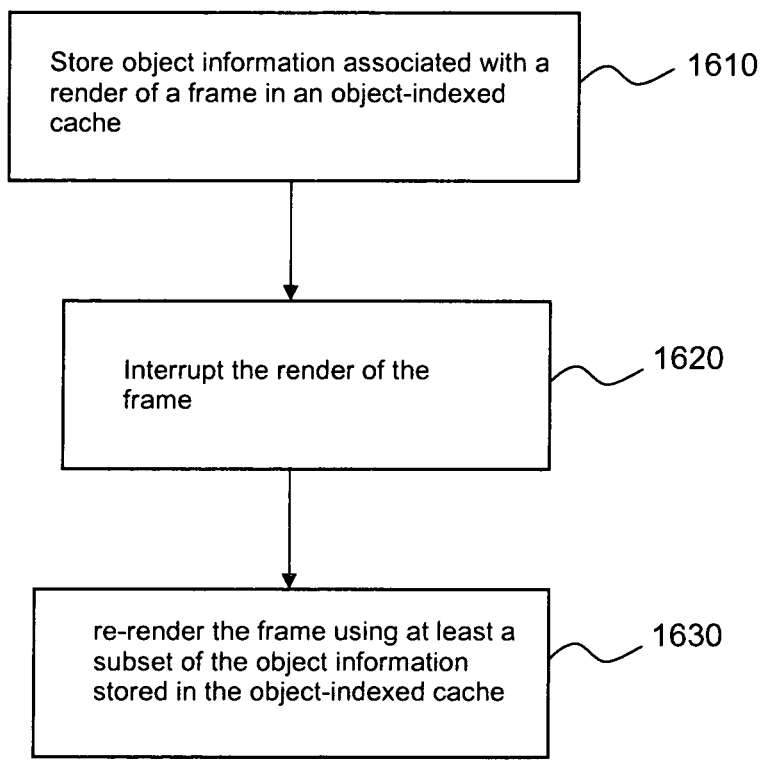
FIG. 16 is a flow diagram of an example embodiment of a method for interrupting a render of a frame.

FIG. 16 is a flow diagram of an example embodiment of a method for interrupting a render of a frame. At block 1610, object information associated with a render of a frame may be stored in an object-indexed cache. At block 1620, the rendering process may be interrupted, and at block 1630 the frame may be re-rendered using at least a subset of the object information stored in the object-indexed cache. An embodiment in accordance with claimed subject matter may include all, more than all or less than all of blocks 1610-1630. Furthermore, the order of blocks 1610-1630 is merely one example order, and the scope of the claimed subject matter is not limited in this respect.

Figure 17:
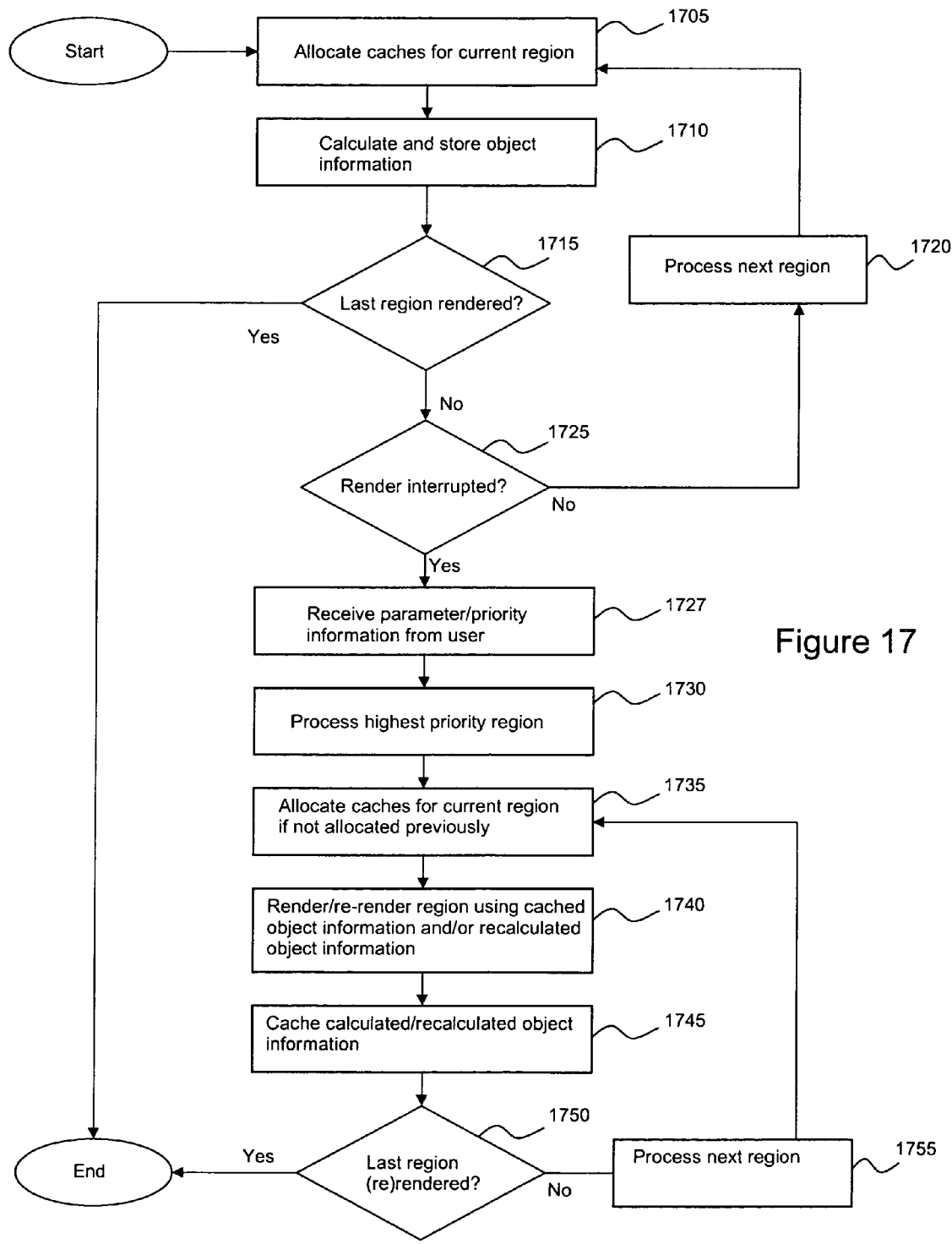
FIG. 17 is a flow diagram of an example embodiment of a method for interrupting a render of a frame and re-rendering the frame.

FIG. 17 is a flow diagram of an example embodiment of a method for interrupting a render of a frame and re-rendering the frame. For this example, processing may begin at block 1705, where as indicated caches may be allocated for a current region. For this example, a scene to be rendered may be divided into a number of regions. Each of the regions may have one or more (or none) objects associated with it. Object-indexed caches may be associated with the objects, as discussed previously. For this example, for an initial render of a frame the caches may need to be allocated (caches may not have been established before an initial render of a frame). At block 1710, as part of the rendering process, object information, perhaps including intermediate shading results and/or other information, may be calculated and stored in one or more caches. At block 1715, a determination may be made as to whether all of the regions have been rendered. If so, processing ends. If regions remain, processing may proceed to block 1725 where a determination may be made as to whether a user has requested that the render operation be interrupted. If the render has not been interrupted, at block 1720 processing may begin on a next region and the example process of FIG. 17 may return to block 1705.

If, for this example, the user has requested that the render operation be interrupted (whether to make changes to lighting parameters and/or to re-prioritize the order in which the regions are to be rendered, for example), lighting parameter and/or region priority information may be received from the user at block 1727 and a re-render process may begin at block 1730, where processing may occur for a highest priority region. The highest priority region may be predetermined, or may be selected by the user, or may be the next region to be rendered in the previously interrupted rendering process. These, of course, are merely examples of how the highest priority region may be determined, and the scope of the claimed subject matter is not limited in these respects.

At block 1735, for the current region if caches have not been previously allocated or if additional caches are desired, caches may be allocated. As discussed previously, the caches may comprise object-indexed caches. At block 1740, the current region may be rendered/re-rendered using cached object information and/or recalculated information, and at block 1745 the calculated and/or recalculated information may be cached in one or more previously allocated object-indexed caches. At block 1750, if regions remain to be rendered, processing of a next region may begin at block 1755 and the rendering operation may continue at block 1735. If no regions remain to be rendered, processing ends. An embodiment in accordance with claimed subject matter may include all, more than all or less than all of blocks 1705-1750. Furthermore, the order of blocks 1705-1750 is merely one example order, and the scope of the claimed subject matter is not limited in this respect.

Figure 18:
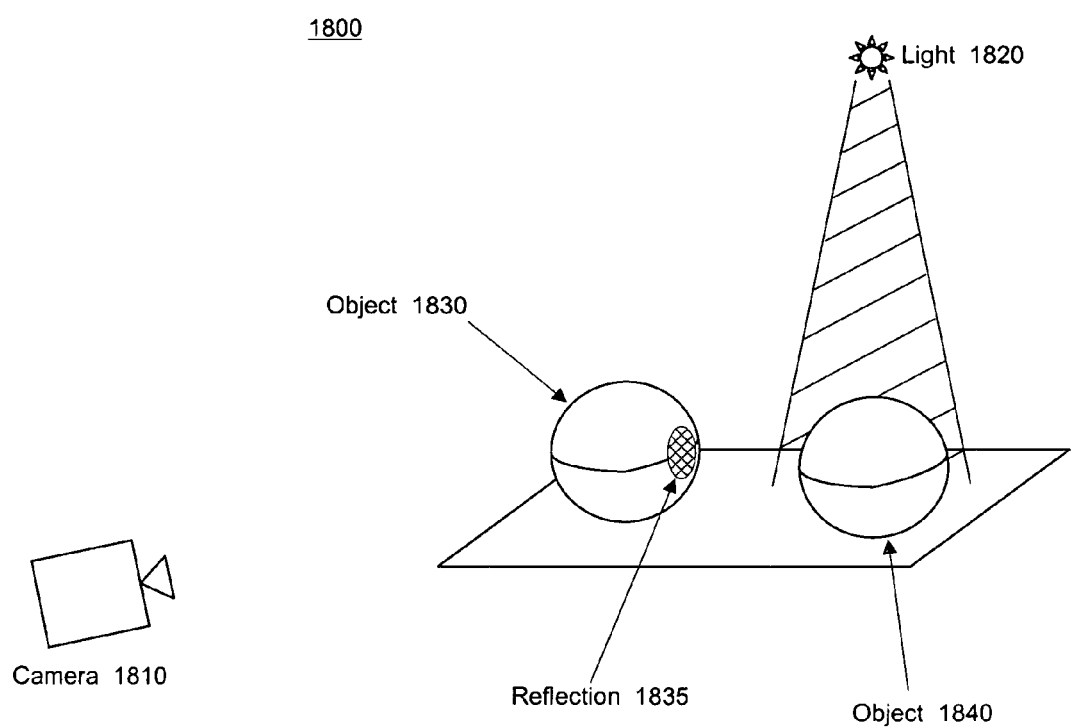
FIG. 18 is a diagram depicting an example scene comprising a light source and two objects.

FIG. 18 is a block diagram of an example scene 1800 comprising a light source 1820, an object 1830 and an object 1840. A camera 1810 is depicted in order to illustrate a possible camera's point of view for this example. Scene 1800 is meant to represent a 3D graphics scene, with objects 1830 and 1840 comprising spheres, although of course the scope of the claimed subject matter is not limited in this respect.

For example scene 1800, light source 1820 may be visible to (that is, provide light for) object 1840. Also for this example, light source 1820 may not be visible to object 1830. However, for this example, a reflection 1835 from object 1840 may be visible on object 1830. As described above, in response to a change in a lighting parameter, a re-render of the scene may occur. For some embodiments, object information affected by the lighting parameter change may be re-calculated, and object information not affected by the lighting parameter change may in various circumstances be fetched from object-indexed caches. For the example of FIG. 18, it is apparent that a change to light source 1820 may affect object information associated with object 1840. However, for this example, because of the reflection from object 1840 on object 1830, object 1830 may indirectly be affected by a change to light source 1820. Therefore, for some embodiments, for some or all objects of a scene a list (or more than one list) of dependencies may be maintained. The list of dependencies may comprise information listing which objects may reflect and/or refract light onto a particular object. For an embodiment, the list of dependencies may be automatically generated and maintained, without the need to user intervention. For some embodiments, a user may generate and/or modify the list of dependencies.

For an embodiment, one or more lists may be maintained that describe which objects may be directly affected by changes to various light sources. One or more other lists may be maintained that describe which objects may be indirectly affected by changes to the various light sources. Such lists may include information regarding the dependencies among various objects in the scene. For example scene 1800, a list describing objects directly affected by light source 1820 may include information identifying object 1840. A list describing objects indirectly affected by light source 1820 may include information identifying object 1830 and may also include information identifying object 1840 as the object upon which object 1830 depends for light from light source 1820. Alternatively, for an embodiment, rather than or in addition to the list describing objects indirectly affected by a particular light source, a list may be maintained for each object including information identifying other objects upon which a particular object depends. Thus, for such an example list associated with object 1830, object 1840 may be identified. Further, for some embodiments, one or more objects may have associated with it a listing of other objects upon which the object reflects and/or refracts light. For example, such a list associated with object 1840 may include information identifying object 1830. The above techniques and/or methods for generating and/or maintaining information regarding lighting dependencies between objects are merely examples, and the scope of the claimed subject matter is not limited in these respects.

For one or more embodiments, if a lighting parameter is changed affecting one or more objects, a determination may be made as to whether other objects may be indirectly affected by the lighting change by way of reflected and/or refracted light. Such a determination may be based, at least is part, upon lists comprising dependency information such as those described above. If such indirect effects are determined to exist, the affected object information for indirectly affected objects may be re-computed as part of a re-render process. In this manner, for this example, if a lighting change is made that affects object 1840, object information associated with object 1830 may be recalculated. For one or more embodiments, a user may have the option to enable or disable the re-computation of indirectly affected object information.

Although the embodiments for recognizing lighting dependencies described herein discuss storing information on an object-by-object basis, the scope of the claimed subject matter is not limited in this respect. For example, embodiments for recognizing lighting dependencies among objects of a scene may be implemented in re-lighting engines that utilize buffers which may be pixel-indexed. Such buffers may for one or more pixels store information regarding which objects are associated with a particular pixel. An embodiment of a pixel-indexed buffer in accordance with claimed subject matter may maintain one or more lists describing lighting dependencies among objects of a scene.

Figure 19:
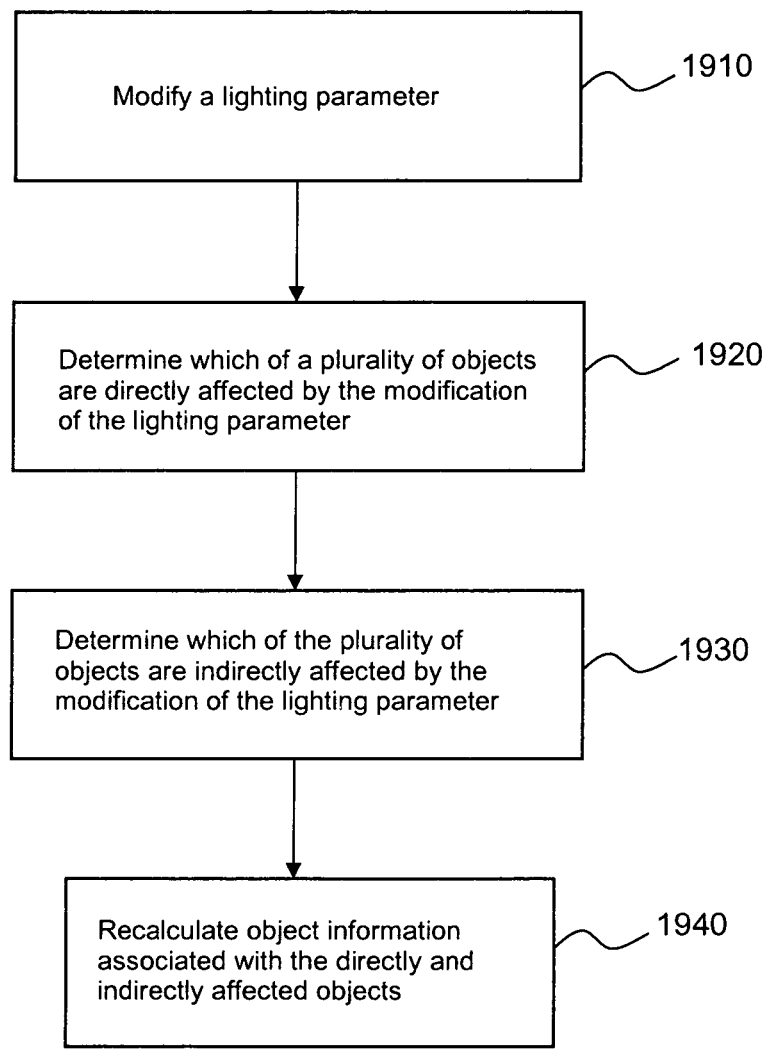
FIG. 19 is a flow chart of an example embodiment of a method for determining lighting dependencies among objects.

FIG. 19 is a flow chart of an example embodiment of a method for determining lighting dependencies among objects. At block 1910, a lighting parameter may be modified. At block 1920, a determination may be made as to which of a plurality of objects may be directly affected by the modification of the lighting parameter. For an embodiment, an object may be said to be directly affected by a modification to a lighting parameter if the object is visible to the light source being modified. At block 1930, a determination may be made as to which of the plurality of objects are indirectly affected by the modification of the lighting parameter. For an embodiment, an object may be said to be indirectly affected by a modification to a lighting parameter if that object receives reflected and/or refracted light from an object that is directly affected by the modification of the lighting parameter. However, these descriptions of "directly affected" and "indirectly affected" are merely examples, and the scope of the claimed subject matter is not limited in these respects. At block 1940, object information associated with the directly and indirectly affected objects may be recalculated. An embodiment in accordance with claimed subject matter may include all, more than all or less than all of blocks 1910-1940. Furthermore, the order of blocks 1910-1940 is merely one example order, and the scope of the claimed subject matter is not limited in this respect.

For at least some of the embodiments described above, changes may be made to lighting parameters and frames may be re-rendered using a combination of object information stored in one or more object-indexed caches and recalculated information for objects affected by the change in the lighting parameters. By taking advantage of information stored in caches, the re-rendering process may be accelerated, as described above. It may also be advantageous to provide accelerated re-rendering in the case of a change of depth-of-field or other camera/lens parameter for a scene. Accelerated re-rendering in response to a change of a camera parameter, for example depth-of-field, may provide quick feedback to an artist or other user and may increase the artist's productivity as well as consume fewer computing platform resources.

Prior attempts to provide somewhat interactive user experiences when the user changes the depth-of-field for a scene may include manipulating the display of a two-dimensional image, perhaps by changing the blurriness for various pixels in an attempt to approximate what a full render might look like with depth-of-field. As discussed previously, full-fidelity rendering for prior systems may be very time and/or resource consuming.

Embodiments implemented in accordance with claimed subject matter may store three-dimensional object data in object-indexed caches, as described above. For one or more embodiments, when a change is made to a camera parameter, some or all of the cached information may be used, thereby greatly reducing the amount of calculations required to perform the re-render. Further, because graphics processing units may be optimized for rasterization operations, a full-fidelity re-render with the new camera parameter may be performed in an accelerated manner, thereby providing a more interactive experience to the artist or other user.

Figure 20:
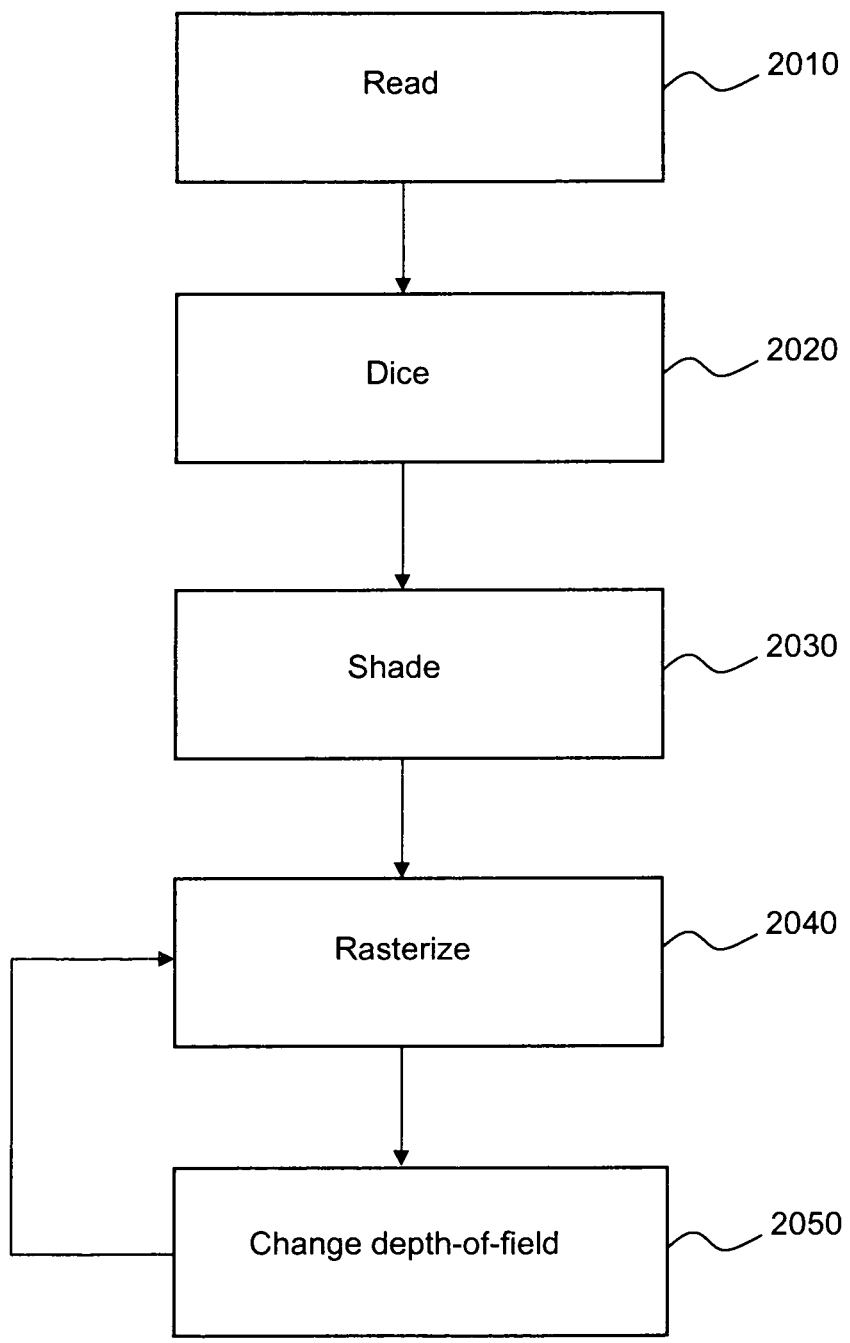
FIG. 20 is a flow chart of an example embodiment of a method for accelerating the re-rendering of a frame in response to a change in depth-of-field.

FIG. 20 is a flow diagram of an example embodiment of a method for accelerating the re-rendering of a frame in response to a change in depth-of-field. FIG. 20 may share some similarities with FIG. 5. Scene data may be read at block 2010. At block 2020, dicing (tessellating) operations may be performed on the objects of the scene. At block 2030, shading operations may be performed, and at block 2040 the image may be rasterized. For one or more embodiments, results of at least some of the shading operations may be stored in one or more object-indexed caches. Further, for an embodiment, the rasterization may be performed by a GPU, although the scope of the claimed subject matter is not limited in this respect. At block 2050, a change may be made to the depth-of-field for the scene. Rather than returning to the shading operations, such as described above in connection with FIG. 5, for example, processing may return to block 2040 and the frame may be re-rasterized with the updated depth-of-field. Because for this embodiment dicing and shading operations are not re-performed, at least to the extent that previous shading results are stored in one or more object-indexed caches, the frame may be quickly re-rendered. For some embodiments, some shading operations may be re-calculated for those operations whose results were not previously stored in an object-indexed cache. An embodiment in accordance with claimed subject matter may include all, more than all, or less than all of blocks 2010-2050. Furthermore, the order of blocks 2010-2050 is merely one example order, and the scope of the claimed subject matter is not limited in this respect.

Figure 21:
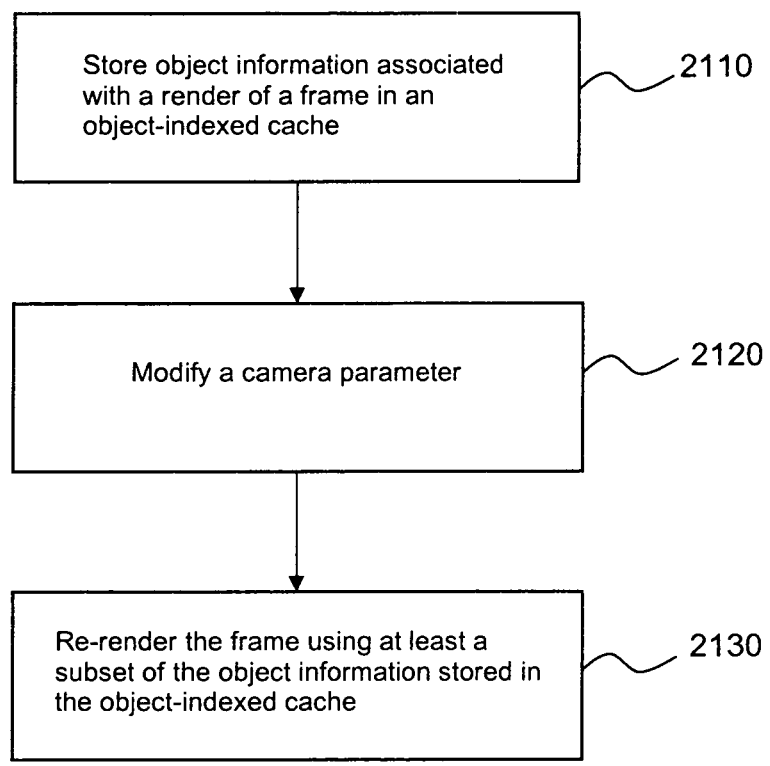
FIG. 21 is a flow chart of an example embodiment of a method for accelerating the re-rendering of a frame in response to a change in a camera parameter.

FIG. 21 is a flow diagram of an example embodiment of a method for accelerating a re-render of a frame in response to a camera parameter modification. At block 2110, object information associated with a render of a frame may be stored in an object-indexed cache, and at block 2120, a camera parameter may be modified. For an embodiment, the camera parameter may comprise depth-of-field. At block 2130, the frame may be re-rendered using at least a subset of the object information stored in the object-indexed cache. An embodiment in accordance with claimed subject matter may include all, more than all, or less than all of blocks 2110-2130. Furthermore, the order of blocks 2110-2130 is merely one example order, and the scope of the claimed subject matter is not limited in this respect.

In addition to accelerating re-rendering operations performed in response to changes to a camera parameter, it may also be desirable to accelerate re-rendering operations performed in response to a change in camera position. For some example embodiments, camera position may relate to camera orientation and/or field of view, although the scope of the claimed subject matter is not limited in this respect. As described above, part of the rendering process may involve determining which objects or points on objects are visible from the camera's perspective. If the camera is moved, the set of visible points may change. For points that may have been hidden prior to the camera move that are now visible, no information will have been previously cached, and therefore additional operations may be performed to allocate caches (if not performed previously), calculate shading operations, and/or to store calculated results in the allocated caches.

Figure 22:
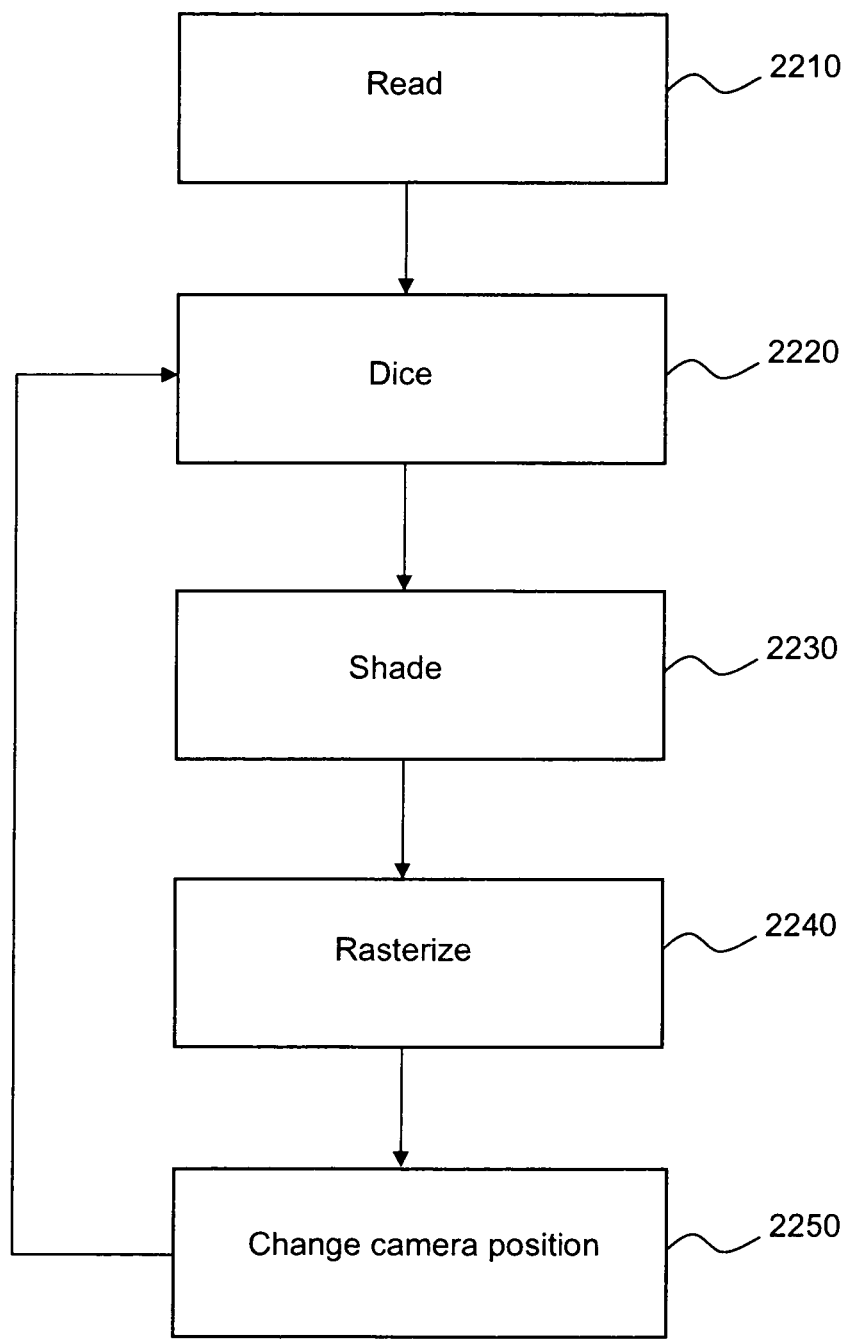
FIG. 22 is a flow chart of an example embodiment of a method for accelerating the re-rendering of a frame in response to a change in camera position.

FIG. 22 is a flow chart of an example embodiment of a method for accelerating the re-rendering of a frame in response to a change in camera position. Scene data may be read at block 2210. At block 2220, dicing (tessellating) operations may be performed on the objects of the scene. At block 2230, shading operations may be performed, and at block 2240 the image may be rasterized. For one or more embodiments, results of at least some of the shading operations may be stored in one or more object-indexed caches. Further, for an embodiment, the rasterization may be performed by a GPU, although the scope of the claimed subject matter is not limited in this respect. At block 2250, a change may be made to the camera position for the scene. To re-render the scene, processing may return to block 2220. At block 2220, a determination may be made as to which previously hidden points are now visible and which previously visible points are now hidden. At block 2230, for previously hidden points that are now visible to the camera, shading operations may be performed and shading results may be stored in an object-indexed cache. Shading results for other points affected by the movement of the camera may also be re-calculated at block 2230. At block 2240, the frame may be re-rasterized using a combination of calculated shading results for newly visible points and other points affected by the camera move and object information previously cached in one or more object-indexed caches. The re-rasterization may be performed by a GPU for one or more embodiments. By calculating shading results for points affected by the camera move and using cached information where possible, the re-render of the frame in response to a change in camera position may be greatly accelerated. The re-render may be further accelerated by using one or more GPUs to perform the rasterization operations. An embodiment in accordance with claimed subject matter may include all, more than all, or less than all of blocks 2210-2250. Furthermore, the order of blocks 2210-2250 is merely one example order, and the scope of the claimed subject matter is not limited in this respect.

Figure 23:
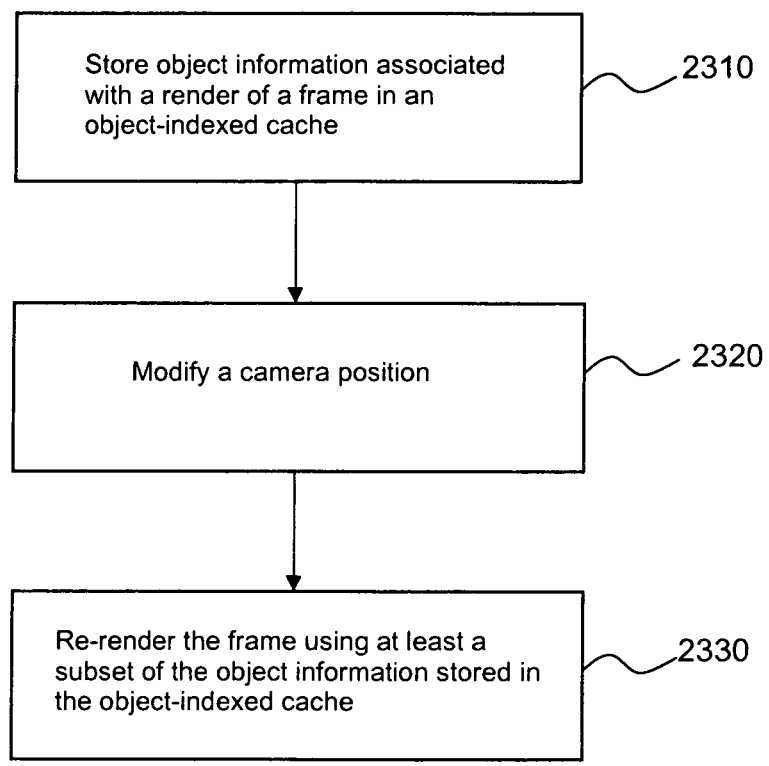
FIG. 23 is a flow chart of another example embodiment of a method for accelerating the re-rendering of a frame in response to a change in camera position.

FIG. 23 is a flow chart of another example embodiment of a method for accelerating the re-rendering of a frame in response to a change in camera position. At block 2310, object information associated with a render of a frame may be stored in an object-indexed cache, and at block 2320 a camera position may be modified. At block 2330 the frame may be re-rendered using at least a subset of the object information stored in the object-indexed cache. An embodiment in accordance with claimed subject matter may include all, more than all, or less than all of blocks 2310-2330. Furthermore, the order of blocks 2310-2330 is merely one example order, and the scope of the claimed subject matter is not limited in this respect.

In the preceding description, various aspects of claimed subject matter have been described. For purposes of explanation, systems and configurations were set forth to provide a thorough understanding of claimed subject matter. However, it should be apparent to one skilled in the art having the benefit of this disclosure that claimed subject matter may be practiced without the specific details. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all such modifications and/or changes as fall within the true spirit of claimed subject matter.

What is claimed is:

1. A method for re-render acceleration of a frame, comprising:

storing one or more results of one or more calculations of lighting contributions from one or more lighting sources associated with a shading operation for one or more points of one or more 3D graphics objects for a first render of a frame in a 3D graphics object-indexed cache on a per-3D graphics object point basis in a memory accessible by a graphics processing unit, the 3D graphics object-indexed cache further to store one or more input values for the one or more calculations associated with the shading operation for the first render of the frame;

modifying a lighting parameter at least in part in response to a lighting change specified by a user; and re-rendering the frame using the graphics processing unit and using at least a subset of the one or more results of the one or more calculations stored in the 3D graphics object-indexed cache at least in part in response to said modifying the lighting parameter, wherein said re-rendering the frame comprises determining whether all of one or more input values for one or more calculations associated with a shading operation of the re-render of the frame match all of the one or more input values for the one or more calculations associated with the shading operation for the first render of the frame, and, in response to a determination of a match, using the results of the one or more calculations for the first render of the frame for the re-render of the frame; and in that event that any of the one or more results stored in the 3D graphics object-indexed cache depend on an external file that has been modified, recalculating the results determined to depend on the external file.

2. The method of claim 1, wherein said re-rendering of the frame further comprises determining which of a plurality of points of one or more 3D graphics objects are affected by said modifying the lighting parameter.

3. The method of claim 2, wherein said re-rendering the frame further comprises recalculating one or more results of one or more calculations associated with one or more of the plurality of points of one or more 3D graphics objects determined to be affected by the said modifying the lighting parameter.

4. The method of claim 2, wherein said re-rendering the frame further comprises retrieving one or more results of one or more calculations associated with one or more of the plurality of points of one or more 3D graphics objects determined to not be affected by said modifying the lighting parameter from the 3D graphics object-indexed cache, and utilizing the retrieved one or more results at least in part for said re-rendering the frame.

5. The method of claim 1, wherein said re-rendering the frame comprises re-rasterizing the frame using the graphics processing unit.

6. The method of claim 4, wherein said re-rendering the frame comprises re-rasterizing the frame utilizing the one or more results of one or more calculations associated with the one or more of the plurality of points of the one or more 3D graphics objects determined to not be affected by said modifying the lighting parameter and further utilizing the recalculated one or more results of one or more calculations associated with the one or more of the plurality of points of the one or more 3D graphics objects determined to be affected by said modifying the lighting parameter.

7. The method of claim 1, further comprising storing one or more results of one or more calculations related to pixel color.

8. The method of claim 1, further comprising determining which of a prioritized list of the results of the one or more calculations of the lighting contributions from the one or more lighting sources for the first render of the frame are to be stored in the 3D graphics object-indexed cache.

9. The method of claim 8, wherein said determining which of the prioritized list of the results of the one or more calculations of the lighting contributions from the one or more lighting sources for the first render of the frame are to be stored in the 3D graphics object-indexed cache comprises basing said determination at least in part on available computer platform resources.

10. The method of claim 9, wherein said basing said determination at least in part on available computer resources comprises determining an amount of memory allocated to the 3D graphics object-indexed cache.

11. The method of claim 8, wherein said determining which of the prioritized list of the results of the one or more calculations of the lighting contributions from the one or more lighting sources for the first render of the frame are to be stored in the 3D graphics object-indexed cache comprises receiving an input from the user indicating at least in part which results of the one or more calculations of the lighting contributions from the one or more lighting sources for the first render of the frame are to be stored in the 3D graphics object-indexed cache.

12. An article comprising: a non-transitory storage medium having stored thereon instructions executable by a computing platform to:
store one or more results of one or more calculations of lighting contributions from one or more lighting sources associated with a shading operation for one or more points of one or more 3D graphics objects for a first render of a frame in a 3D graphics object-indexed cache on a per-3D graphics object point basis;
store one or more input values for the one or more calculations associated with the shading operation for the first render of the frame;
modify a lighting parameter at least in part in response to a lighting change specified by a user; and
re-render the frame using at least a subset of the one or more results of the one or more calculations stored in the 3D graphics object-indexed cache at least in part in response to the modification of the lighting parameter, wherein said re-rendering the frame comprises determining whether all of one or more input values for one or more calculations associated with a shading operation of the re-render of the frame match all of the one or more input values for the one or more calculations associated with the shading operation for the first render of the frame, and, in response to a determination of a match, using the results of the one or more calculations for the first render of the frame for the re-render of the frame; and in that event that any of the one or more results stored in the 3D graphics object-indexed cache depend on an external file that has been modified, recalculating the results determined to depend on the external file.

13. The article of claim 12, wherein the storage medium has stored thereon further instructions executable by the computing platform to re-render the frame at least in part by determining which of a plurality of points of one or more 3D graphics objects are affected by the modification of the lighting parameter.

14. The article of claim 13, wherein the storage medium has stored thereon further instructions executable by the computing platform to recalculate one or more results of one or more calculations associated with one or more of the plurality of points of one or more 3D graphics objects determined to be affected by the modification of the lighting parameter.

15. The article of claim 13, wherein the storage medium has stored thereon further instructions executable by the computing platform to re-render the frame at least in part by retrieving one or more results of one or more calculations associated with one or more of the plurality of points of one or more 3D graphics objects determined to not be affected by the modification of the lighting parameter from the 3D graphics object-indexed cache, and by utilizing the retrieved one or more results at least in part for said re-render of the frame.

16. The article of claim 12, wherein the storage medium has stored thereon further instructions executable by the computing platform to re-render the frame by re-rasterizing the frame.

17. The article of claim 15, wherein the storage medium has stored thereon further instructions executable by the computing platform to re-render the frame at least in part by re-rasterizing the frame utilizing the one or more results of one or more calculations associated with the one or more of the plurality of points of the one or more 3D graphics objects determined to not be affected by the modification of the lighting parameter and also by utilizing the recalculated one or more results of one or more calculations associated with the one or more of the plurality of points of the one or more 3D graphics objects determined to be affected by the modification of the lighting parameter.

18. The article of claim 12, wherein the storage medium has stored thereon further instructions executable by the computing platform to store one or more results of one or more calculations related to pixel color.

19. The article of claim 12, wherein the storage medium has stored thereon further instructions executable by the computing platform to determine which of a prioritized list of the results of the one or more calculations of the lighting contributions from the one or more lighting sources for the first render of the frame are to be stored in the 3D graphics object-indexed cache.

20. The article of claim 19, wherein the storage medium has stored thereon further instructions executable by the computing platform to determine which of the prioritized list of the results of the one or more calculations of the lighting contributions from the one or more lighting sources for the first render of the frame are to be stored in the 3D graphics object-indexed cache at least in part by basing said determination at least in part on available computer platform resources.

21. The article of claim 20, wherein the storage medium has stored thereon further instructions executable by the computing platform to base said determination at least in part on available computer resources by determining an amount of memory allocated to the 3D graphics object-indexed cache.

22. The article of claim 19, wherein the storage medium has stored thereon further instructions executable by the computing platform to determine which of the prioritized list of the results of the one or more calculations of the lighting contributions from the one or more lighting sources for the first render of the frame are to be stored in the 3D graphics object-indexed cache at least in part by receiving an input from the user indicating at least in part which results of the one or more calculations of the lighting contributions from the one or more lighting sources for the first render of the frame are to be stored in the 3D graphics object-indexed cache.

23. An apparatus, comprising:
a graphics processor to:
store one or more results of one or more calculations of lighting contributions from one or more lighting sources associated with a shading operation for one or more points of one or more 3D graphics objects for a first render of a frame in a 3D graphics object-indexed cache one a per-3D graphics object point basis in a memory coupled to the graphics processor, the 3D graphics object-indexed cache further to store one or more input values for the one or more calculations associated with the shading operation for the first render of the frame;
modify a lighting parameter at least in part in response to a lighting change specified by a user; and
re-render the frame using at least a subset of the one or more results of the one or more calculations stored in the 3D graphics object-indexed cache at least in part in response to the modification of lighting parameter, wherein said re-rendering the frame comprises determining whether all of one or more input values for one or more calculations associated with a shading operation of the re-render of the frame match all of the one or more input values for the one or more calculations associated with the shading operation for the first render of the frame, and, in response to a determination of a match, using the results of the one or more calculations for the first render of the frame for the re-render of the frame; and in that event that any of the one or more results stored in the 3D graphics object-indexed cache depend on an external file that has been modified, recalculating the results determined to depend on the external file.

24. The apparatus of claim 23, the graphics processor further to:
re-render the frame at least in part by determining which of a plurality of points of one or more 3D graphics objects are affected by the modification of lighting parameter; and
recalculate one or more results of one or more calculations associated with one or more of the plurality of points of the one or more 3D graphics objects determined to be affected by the modification of the lighting parameter.

25. The apparatus of claim 23, the graphics processor further to re-render the frame at least in part by re-rasterizing the frame utilizing the one or more results of one or more calculations associated with the one or more of the plurality of points of the one or more 3D graphics objects determined to not be affected by the modification of the lighting parameter and further by utilizing the recalculated one or more results associated with the one or more of the plurality of points of the one or more 3D graphics objects determined to be affected by the modification of the lighting parameter.

26. The apparatus of claim 23, the graphics processor further to determine which of a prioritized list of the results of the one or more calculations associated with the shading operation of the first render of the frame are to be stored in the 3D graphics object-indexed cache.

27. The apparatus of claim 26, the graphics processor further to determine which of the prioritized list of the results of the one or more calculations of the lighting contributions from the one or more lighting sources for the frame are to be stored in the 3D graphics object-indexed cache at least in part by basing said determination at least in part on available computer platform resources.

28. The apparatus of claim 27, the graphics processor further to base said determination at least in part on available computer resources by determining an amount of memory allocated to the 3D graphics object-indexed cache.

29. The apparatus of claim 26, the graphics processor further to determine which of the prioritized list of the results of the one or more calculations of the lighting contributions from the one or more lighting sources for the frame are to be stored in the 3D graphics object-indexed cache at least in part by receiving an input from the user indicating at least in part which results of the one or more calculations of the lighting contributions from the one or more lighting sources for the first render of the frame are to be stored in the 3D graphics object-indexed cache.

* * * * *